(12) United States Patent
Toth et al.

(10) Patent No.: US 12,461,205 B2
(45) Date of Patent: Nov. 4, 2025

(54) CAMERA RING STRUCTURE FOR AUTONOMOUS VEHICLES

(71) Applicant: WAYMO LLC, Mountain View, CA (US)

(72) Inventors: Kimberly Geneva Toth, Sunnyvale, CA (US); Brendan Hermalyn, San Francisco, CA (US); Shane Mcguire, Mountain View, CA (US); Felix Jose Alvarez Rivera, Tarzana, CA (US); Jeremy Dittmer, Mountain View, CA (US); Andreas Wendel, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 54 days.

(21) Appl. No.: 18/229,259

(22) Filed: Aug. 2, 2023

(65) Prior Publication Data

US 2023/0393244 A1   Dec. 7, 2023

Related U.S. Application Data

(63) Continuation of application No. 18/082,791, filed on Dec. 16, 2022, now Pat. No. 11,762,063, which is a (Continued)

(51) Int. Cl.
*G05D 1/00* (2024.01)
*B60R 11/04* (2006.01)
(Continued)

(52) U.S. Cl.
CPC ............ *G01S 7/4813* (2013.01); *B60R 11/04* (2013.01); *G05D 1/0088* (2013.01);
(Continued)

(58) Field of Classification Search
CPC ....... G01S 7/4813; H04N 23/51; B60R 11/04; B60R 2300/102; B60R 2300/105; G05D 1/0088; G05D 1/0246
See application file for complete search history.

(56) References Cited

U.S. PATENT DOCUMENTS

| 5,246,193 A | 9/1993 | Faidley |
| 6,950,120 B1 | 9/2005 | Endo et al. |
| (Continued) | | |

FOREIGN PATENT DOCUMENTS

| CN | 202794836 U | 3/2013 |
| CN | 205523964 U | 8/2016 |
| (Continued) | | |

OTHER PUBLICATIONS

First Examination Report for Australian Patent Application No. 2019285161, Sep. 3, 3021.
(Continued)

*Primary Examiner* — Mathew Franklin Gordon
(74) *Attorney, Agent, or Firm* — Botos Churchill IP Law LLP

(57) ABSTRACT

The technology relates to autonomous vehicles that use a perception system to detect objects and features in the vehicle's surroundings. A camera assembly having a ring-type structure is provided that gives the perception system an overall 360° field of view around the vehicle. Image sensors are arranged in camera modules around the assembly to provide a seamless panoramic field of view. One subsystem has multiple pairs of image sensors positioned to provide the overall 360° field of view, while another subsystem provides a set of image sensors generally facing toward the front of the vehicle to provide enhanced object identification. The camera assembly may be arranged in a housing located on top of the vehicle. The housing may include other sensors such as LIDAR and radar. The assem-
(Continued)

bly includes a chassis and top and base plates, which may provide EMI protection from other sensors disposed in the housing.

20 Claims, 23 Drawing Sheets

Related U.S. Application Data continuation of application No. 17/503,571, filed on Oct. 18, 2021, now Pat. No. 11,561,282, which is a continuation of application No. 16/008,462, filed on Jun. 14, 2018, now Pat. No. 11,181,619.

(51) Int. Cl.
*G01S 7/481* (2006.01)
*H04N 23/51* (2023.01)

(52) U.S. Cl.
CPC .......... *G05D 1/0246* (2013.01); *H04N 23/51* (2023.01); *B60R 2300/102* (2013.01); *B60R 2300/105* (2013.01)

(56) References Cited

U.S. PATENT DOCUMENTS

| | | | |
|---|---|---|---|
| 8,493,436 B2 | 7/2013 | Lyon et al. | |
| 8,811,812 B1 | 8/2014 | Lawler et al. | |
| 8,937,643 B1 | 1/2015 | Esteban et al. | |
| 9,625,582 B2 | 4/2017 | Gruver et al. | |
| 10,757,320 B2 | 8/2020 | Wendel et al. | |
| 2009/0201361 A1 | 8/2009 | Lyon et al. | |
| 2010/0220173 A1 | 9/2010 | Anguelov et al. | |
| 2010/0245539 A1 | 9/2010 | Lin | |
| 2010/0295945 A1 | 11/2010 | Plemons et al. | |
| 2011/0164108 A1 | 7/2011 | Bates et al. | |
| 2015/0307026 A1 | 10/2015 | Minikey et al. | |
| 2016/0212409 A1 | 7/2016 | Cole et al. | |
| 2016/0269716 A1 | 9/2016 | Cole et al. | |
| 2016/0291134 A1 | 10/2016 | Droz et al. | |
| 2016/0352982 A1* | 12/2016 | Weaver | H04N 23/695 |
| 2017/0008562 A1 | 1/2017 | Shashua et al. | |
| 2017/0078647 A1 | 3/2017 | Van Hoff et al. | |
| 2017/0305360 A1 | 10/2017 | Zajac | |
| 2017/0363949 A1 | 12/2017 | Valente et al. | |
| 2018/0048801 A1 | 2/2018 | Kiser et al. | |
| 2018/0054553 A1 | 2/2018 | Choi et al. | |
| 2019/0087772 A1* | 3/2019 | Medina | G05D 1/106 |
| 2020/0169648 A1 | 5/2020 | Percival et al. | |

FOREIGN PATENT DOCUMENTS

| | | |
|---|---|---|
| CN | 108139465 A | 6/2018 |
| EP | 3034359 A1 | 6/2016 |
| EP | 3229073 A1 | 10/2017 |
| JP | 2012204983 A | 10/2012 |
| JP | 2012220521 A | 11/2012 |
| JP | 2014115374 A | 6/2014 |
| JP | 2017206196 A | 11/2017 |
| JP | 2018081008 A | 5/2018 |
| WO | 2009097449 A1 | 8/2009 |
| WO | 2016191708 A1 | 12/2016 |
| WO | 2017076383 A1 | 5/2017 |
| WO | 2017176352 A1 | 10/2017 |

OTHER PUBLICATIONS

Japanese Office Action for JP Application No. 2022-082061 dated Jul. 4, 2023, 5 pgs.
Notice of Reasons for Rejection for Japanese Patent Application No. 2020-564134, Mar. 4, 2022.
Office Action for Chinese Patent Application No. 201980039930.9, Jan. 26, 2022.
The Extended European Search Report for European Patent Application No. 19818875.7, Dec. 13, 2021.
The First Office Action for Chinese Patent Application No. 201980039930.9, Aug. 27, 2021.
Third Examination Report for Australian Patent Application No. 2019285161, Oct. 13, 3021.
"International Search Report and Written Opinion for application No. PCT/US2019/036955 dated Oct. 16, 2019", 11 pages.
Anguelov , et al., "Google Street View: Capturing the World at Street Level", IEEE, 2010, 7 pages.
Klingner , et al., "Street View Motion-from-Structure-from-Motion", Computer Vision Foundation, 2013, pp. 953-960.
Kollam , "Autonomous Car—Chapter 1", Seminar Report, Dept. of ECE, T.K.M Institute of Technology, 2013, pp. 1-33.
Patriwar , et al., "A Survey on Google Car and Its Possible Challenges on Indian Roads", International Journal for Engineering Applications and Technology, vol. 3, No. 5, available at <http://www.ijfeal.org>, retrieved from the internet on May 2018, pp. 40-47.
Pless , "Using Many Cameras as One", Department of Computer Science and Engineering, Washington University in St. Louis, MO., pp. 1-7, 2003.

\* cited by examiner

500

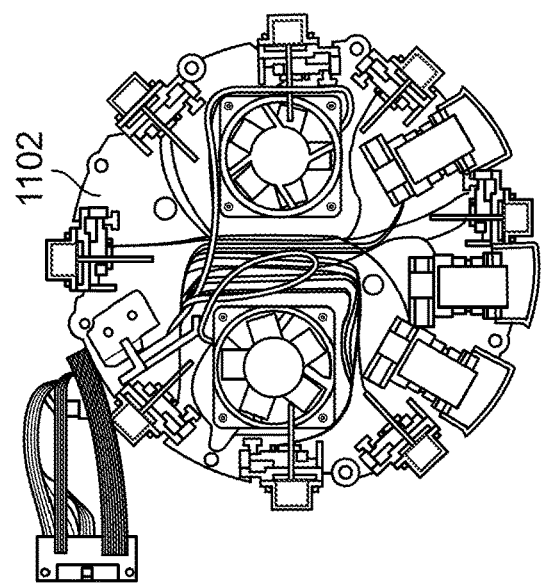
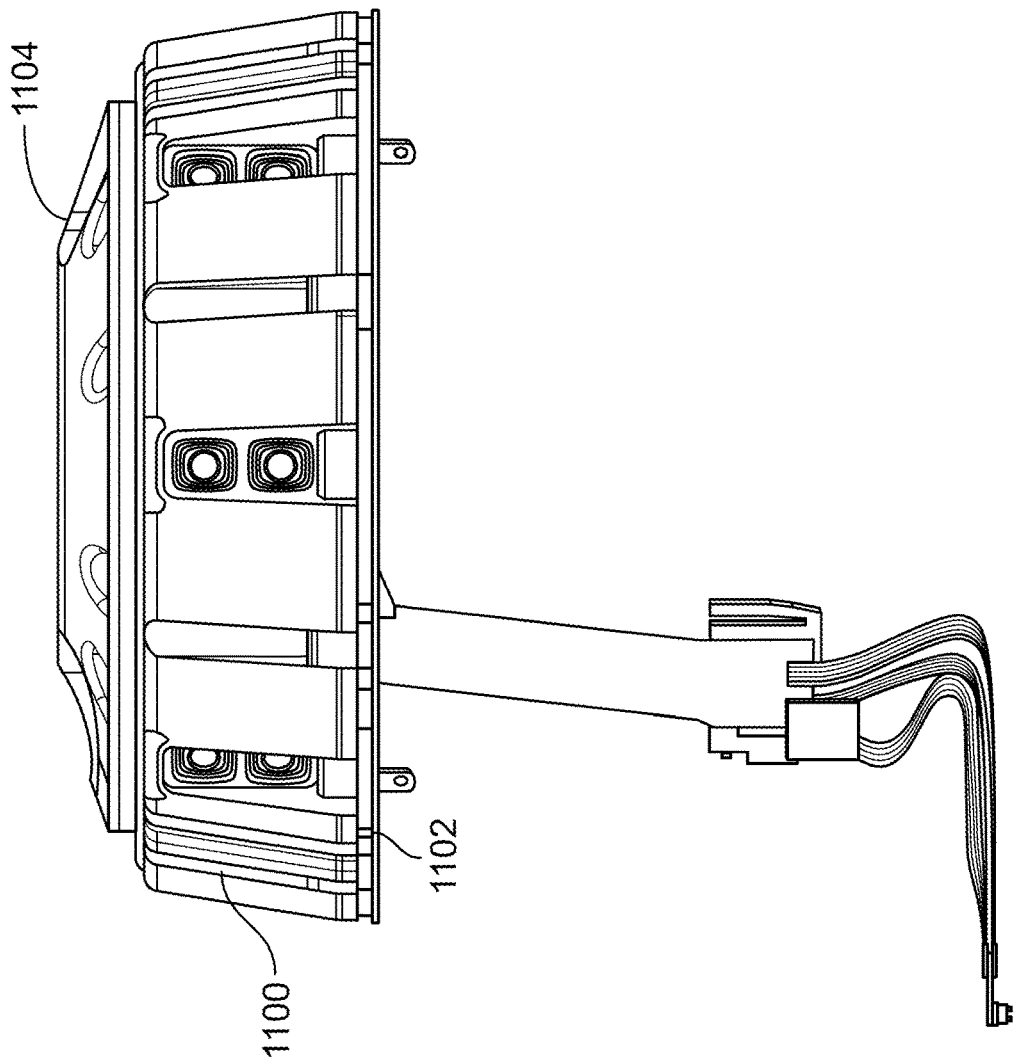

CAMERA RING STRUCTURE FOR AUTONOMOUS VEHICLES

CROSS-REFERENCE TO RELATED APPLICATIONS

This application is a continuation of U.S. application Ser. No. 18/082,791, filed Dec. 16, 2022, which is a continuation of U.S. application Ser. No. 17/503,571, filed Oct. 18, 2021, now issued as U.S. Pat. No. 11,561,282 on Jan. 24, 2023, which is a continuation of U.S. application Ser. No. 16/008,462, filed Jun. 14, 2018 now issued as U.S. Pat. No. 11,181,619 on Nov. 23, 2021, the entire disclosures of which are incorporated herein by reference.

BACKGROUND

Autonomous vehicles, in particular vehicles that do not require a human driver, can be used to transport passengers, cargo or other items from one location to another. Such vehicles may operate in a fully autonomous mode without any driving input from a passenger, or a partially autonomous mode where a person in the vehicle may provide some driving input. To aid driving in an autonomous mode, sensors are used to detect features and objects in the environment around the vehicle. The sensors may include one or more cameras at different locations about the vehicle in order to gather information about the surrounding environment. However, the types of cameras used, their placement and sensing abilities may impact whether the vehicle can effectively operate in a partially or fully autonomous mode.

BRIEF SUMMARY

Aspects of the disclosure provide a camera ring structure that is especially beneficial for vehicles configured to operate in an autonomous driving mode. The camera ring structure co-locates various image sensors in a camera assembly designed to provide seamless and unimpeded fields of view around the vehicle. The structure also provides mechanical stiffness and dampening to ensure image sensor operation within defined tolerances. Other types sensors may be co-located with the camera image sensors as part of a comprehensive sensor system. The structure can provide protection against electromagnetic interference (EMI), for instance from other sensors such as light detection and ranging (LIDAR) sensors and radar sensors. In addition, the structure can include a thermal heatsink or otherwise provide a degree of temperature regulation to the cameras and other components of the sensor system.

According to one aspect, a camera assembly is provided for use on a vehicle configured to operate in an autonomous driving mode. The camera assembly includes a chassis having a first side and a second side, and a top plate affixed to the second side of the chassis. The chassis includes a series of camera mounts distributed therealong and extending away from the second side. A set of camera modules is each affixed to one of the series of camera mounts. The set of camera modules includes a first subset and a second subset. The first subset of camera modules each includes a pair of image sensors and the second subset of camera modules each includes one image sensor. The first subset of camera modules is arranged to provide a 360° field of view around the vehicle. The camera assembly also includes a base plate affixed to the set of camera modules, and an outer cover disposed between the top plate and the base plate. The outer cover includes a series of openings corresponding to fields of view of the image sensors of the first and second subsets. The second subset of camera modules may be arranged to provide a field of view of between 60-135° along a front of the vehicle.

In one example, the pair of image sensors in each respective camera module of the first subset is co-located and aligned along a common vertical axis. Here, both image sensors of the pair of image sensors may have substantially equivalent fields of view. In this case, the substantially equivalent fields of view may be on the order of 45°.

In another example, the image sensors of each camera module in the first subset have overlapping fields of view with the image sensors from each adjacent camera module of the first subset, and the image sensor of each camera module in the second subset has an overlapping fields of view with the image sensor from each adjacent camera module of the second subset. In this case, the overlapping fields of view for the image sensors of the first subset of camera modules may be between 0.5-4°, and the overlapping fields of view for the image sensors of the second subset of camera modules may be between 3-4°.

The top plate, base plate and outer cover may be configured to provide at least one of electromagnetic interference protection for the camera modules from emissions by other sensors, and electromagnetic interference protection for the other sensors from emissions by the camera modules. The camera assembly may also include at least one fan disposed between the top plate and the base plate.

According to another aspect, a sensor assembly for use on a vehicle configured to operate in an autonomous driving mode is provided. The sensor assembly includes a housing having a base region configured to attach to a surface of the vehicle, a top region opposite the base region, and a sidewall extending between the base region and the top region. A first sensor is disposed within the housing. A camera assembly is disposed within the housing and coupled to the sidewall. The camera assembly comprises a chassis having a first side and a second side. The chassis includes a series of camera mounts distributed therealong and extending away from the second side. A top plate is affixed to the second side of the chassis. A set of camera modules is each affixed to one of the series of camera mounts, in which the set of camera modules includes a first subset and a second subset. The first subset of camera modules each includes a pair of image sensors and the second subset of camera modules each includes one image sensor. The first subset of camera modules is arranged to provide a 360° field of view around the vehicle. A base plate is affixed to the set of camera modules. And an outer cover is disposed between the top plate and the base plate. The outer cover includes a series of openings corresponding to fields of view of the image sensors of the first and second subsets.

In one alternative, the sensor assembly further includes a second sensor disposed within the housing. The first sensor is arranged between the top plate of the camera assembly and the top region of the housing, and the second sensor is arranged between the base plate of the camera assembly and the base region of the housing. At least one of the first and second sensors may be a light detection and ranging (LIDAR) sensor.

In one example, at least a portion of the sidewall adjacent to the set of camera modules is optically transparent. In another example, the sensor assembly further includes one or more processors disposed within the housing. The one or more processors are operatively coupled to the first sensor and the first and second subsets of camera modules.

According to a further aspect, a vehicle configured to operate in an autonomous mode is provided. The vehicle comprises a driving system configured to perform driving operations, a perception system configured to detect objects in an environment surrounding the vehicle, and a control system operatively coupled to the driving system and the perception system. The control system has one or more computer processors configured to receive data from the perception system and to direct the driving system when operating in the autonomous mode. The perception system includes a camera assembly, which includes a chassis having a first side and a second side and a top plate affixed to the second side of the chassis. The chassis includes a series of camera mounts distributed therealong and extending away from the second side. The camera assembly also includes a set of camera modules each affixed to one of the series of camera mounts. The set of camera modules includes a first subset and a second subset. The first subset of camera modules each includes a pair of image sensors and the second subset of camera modules each includes one image sensor. The first subset of camera modules is arranged to provide a 360° field of view around the vehicle. In addition, a base plate is affixed to the set of camera modules, and an outer cover is disposed between the top plate and the base plate. The outer cover includes a series of openings corresponding to fields of view of the image sensors of the first and second subsets.

In one example, the second subset of camera modules are arranged to provide a field of view of between 60-135° along a front of the vehicle. In another example, the pair of image sensors in each respective camera module of the first subset is co-located and aligned along a common vertical axis.

In a further example, the image sensors of each camera module in the first subset have overlapping fields of view with the image sensors from each adjacent camera module of the first subset, and the image sensor of each camera module in the second subset has an overlapping fields of view with the image sensor from each adjacent camera module of the second subset.

In yet another example, the perception system further includes a housing having a base region configured to attach to a roof of the vehicle, a top region opposite the base region, and a sidewall extending between the base region and the top region. It also includes a first sensor disposed within the housing. The camera assembly is disposed within the housing and coupled to the sidewall. In this case, the perception system may further include a second sensor disposed within the housing. Here, the first sensor is arranged between the top plate of the camera assembly and the top region of the housing, and the second sensor is arranged between the base plate of the camera assembly and the base region of the housing.

BRIEF DESCRIPTION OF THE DRAWINGS

FIGS. 11A-C illustrate further elements of the camera assembly of FIGS. 10A-C in accordance with aspects of the disclosure.

DETAILED DESCRIPTION

Overview

The technology relates to vehicles that may transport people, cargo or other items between locations while driving in a fully autonomous or semi-autonomous mode. While certain aspects of the disclosure are particularly useful in connection with specific types of vehicles, the technology may be employed with various types of vehicles including, but not limited to, cars, trucks, motorcycles, busses, boats, lawnmowers, recreational vehicles, farm equipment, construction equipment, trams, golf carts, trolleys and the like.

There are different degrees of autonomy that may be employed by a vehicle having a partially or fully autonomous driving system. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Here, an advanced driver assistance system (ADAS) can assist the human driver with either steering or braking/acceleration, but not both simultaneously. Level 2 has partial automation of certain driving operations. In particular, the ADAS is able to control both steering and braking/acceleration at the same time under certain circumstances. Nonetheless, the driver must monitor the driving environment in such circumstances and perform the rest of the driving task(s). Level 3 involves conditional automation that can enable a person in the driver's seat to take control as warranted. Here, an Automated Driving System (ADS) of the vehicle is configured to perform all aspects of driving under certain circumstances. In this case, the driver must be able to take control at any time when requested by the ADS to do so. In all other situations, the driver performs the driving. In contrast, Level 4 is a high automation level where the vehicle is able to drive without assistance in select conditions. Here, the ADS performs all driving operations and monitors the driving environment in particular situations. And Level 5 is a fully autonomous mode in which the vehicle is able to perform all driving operations in all situations without passenger assistance. The architectures, components, systems and methods described herein can function in any of the semi or fully-autonomous modes, e.g., Levels 1-5, which are referred to herein as "autonomous"

driving modes. Thus, reference to an autonomous driving mode includes both partial and full autonomy, and an autonomous vehicle is a vehicle configured to operate in an autonomous driving mode.

Figure 1:
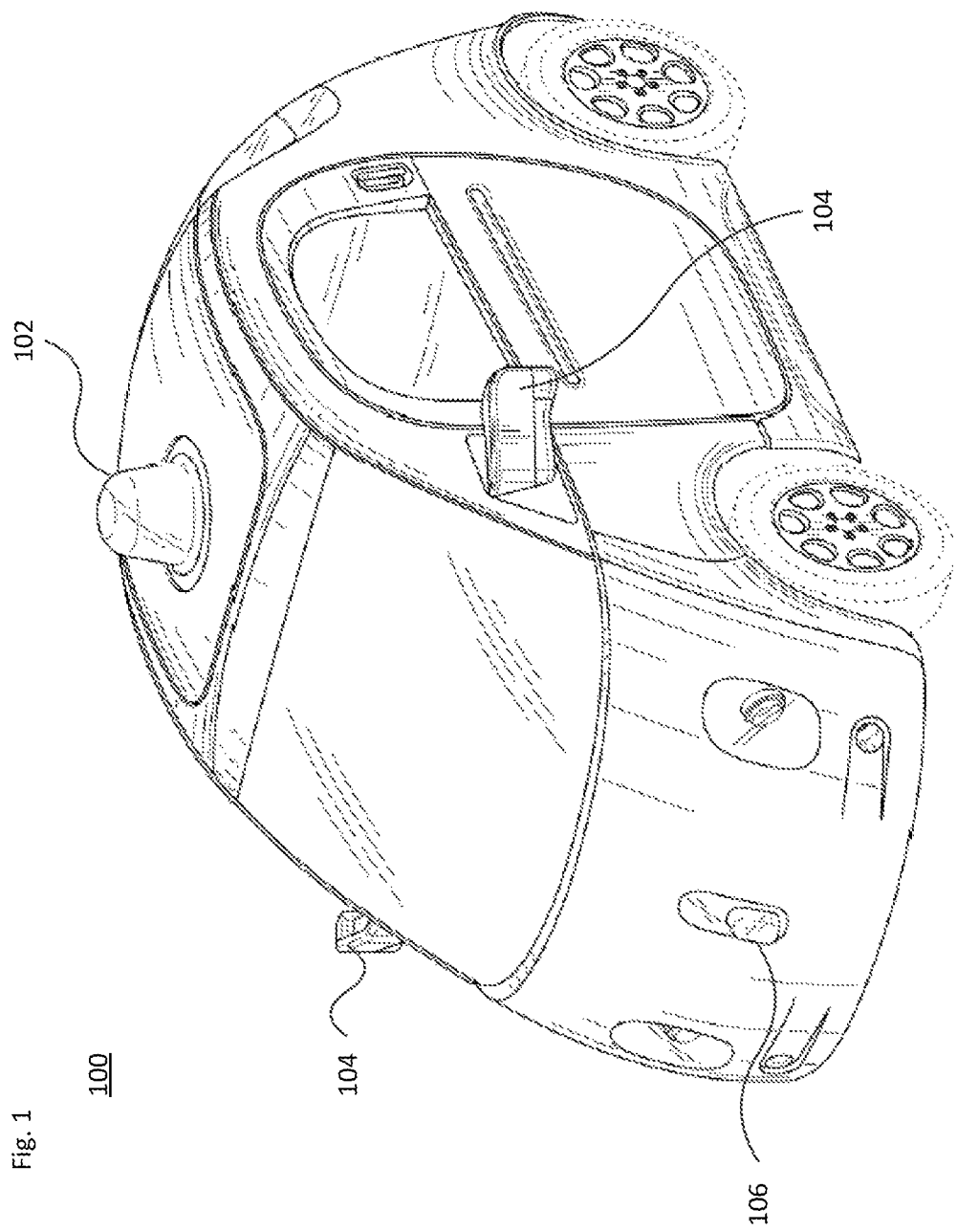
FIG. 1 illustrates an example autonomous vehicle for use with camera ring structures according to aspects of the disclosure.

In certain vehicles such as sedans, SUVs, minivans, coupes and crossovers, it is possible to achieve 360° visibility from a single vantage point. For instance, FIG. 1 illustrates an example car 100 having a sensor assembly 102 located on the roof, as well as side sensors 104 and a front facing sensor 106. Other sensors, such as a rear facing sensor (not shown) may also be employed. By way of example, the sensor assembly 102 may provide 360° visibility around the vehicle, while the other sensors may provide supplemental information regarding the environment. Camera ring structures and related components describe herein may be employed as part of the sensor assembly 102.

Example Systems

Figure 2:
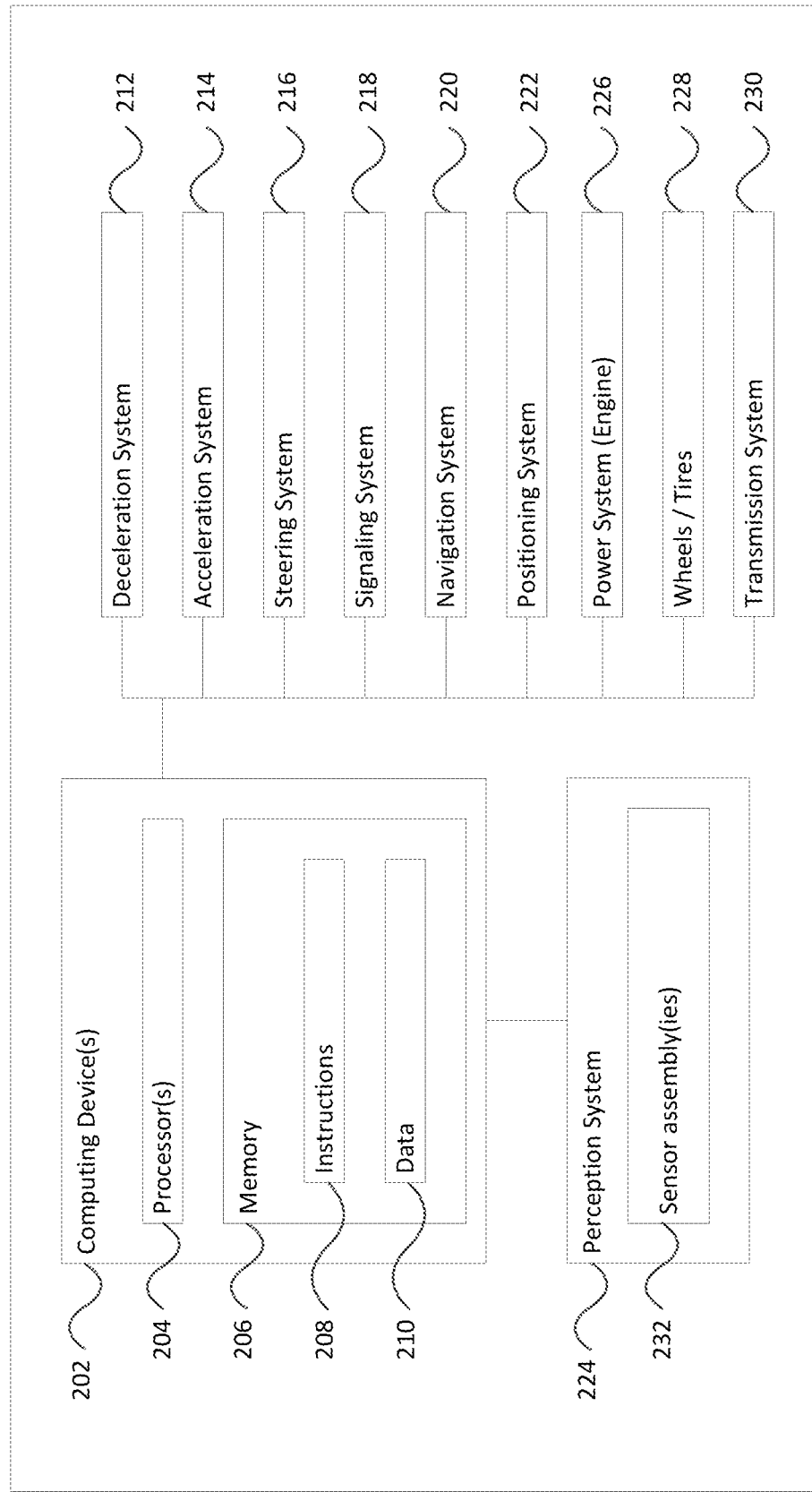
FIG. 2 illustrates a system diagram of an autonomous vehicle in accordance with aspects of the disclosure.

FIG. 2 illustrates a block diagram 200 with various components and systems of a vehicle, such as a car, capable of operating in an autonomous driving mode. As shown in the block diagram, the vehicle may have a control system of one or more computing devices, such as computing devices 202 containing one or more processors 204, memory 206 and other components typically present in general purpose computing devices.

The memory 206 stores information accessible by the one or more processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. As an example, data 210 of memory 206 may store information, such as calibration information, to be used when calibrating different types of sensors.

The one or more processor 204 may be any conventional processors, such as commercially available CPUs. Alternatively, the one or more processors may be a dedicated device such as an ASIC or other hardware-based processor. Although FIG. 2 functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may implement an autonomous driving computing system incorporated into vehicle 100 or other vehicles. The autonomous driving computing system may capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle).

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of vehicle 100 in accordance with the instructions 208 of memory 206 in an autonomous driving mode which does not require or need continuous or periodic input from a passenger of the vehicle. The wheels/tires 228 are coupled to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 or 120 by steering system 216), and signal such changes (e.g., by lighting turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a sedan, minivan or SUV, the steering system 216 may include components to control the angle of wheels to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or data 210 may store map information, e.g., highly detailed maps that computing devices 202 can use to navigate or control the vehicle. As an example, these maps may identify the shape and elevation of roadways, lane markers, intersections, crosswalks, traffic signals, buildings, signs, vegetation, or other such objects. The maps may also provide other information, including speed limits and real time traffic information.

The perception system 224 also includes one or more components for detecting objects external to the vehicle such as other vehicles, obstacles in the roadway, traffic signals, signs, trees, etc. For example, the perception system 224 may include one or more sets of cameras including image sensors, one or more LIDAR sensors, radar units, sonar devices, cameras, inertial (e.g., gyroscopic) sensors, and/or any other detection devices that record data which may be processed by computing devices 202. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can sent for further processing to the computing devices 202 periodically and continuously as it is generated by the perception system 224. Computing devices 202 may use the positioning system 222 to determine the vehicle's location and perception system 224 to detect and respond to objects when needed to reach the location safely. In addition, the computing devices 202 may perform calibration of individual sensors, all sensors in a particular sensor assembly, or between sensors in different sensor assemblies.

As indicated in FIG. 2, the perception system 224 includes one or more sensor assemblies 232. In one example, a sensor assembly may be a central housing located at a position on the vehicle capable of providing 360° visibility around the vehicle. In another example, multiple sensor assemblies may be distributed at selected points along the vehicle. A connection (not shown) may provide the power, communication and/or other connections between a sensor assembly and one or more other systems of the vehicle. For instance, a data communication bus may provide bidirectional communication between cameras and other sensors of the sensor assembly and the computing devices 202. A power line may be connected directly or indirectly to the power system 226, or to a separate power source such as a battery controlled by the computing devices 202.

Figure 3:
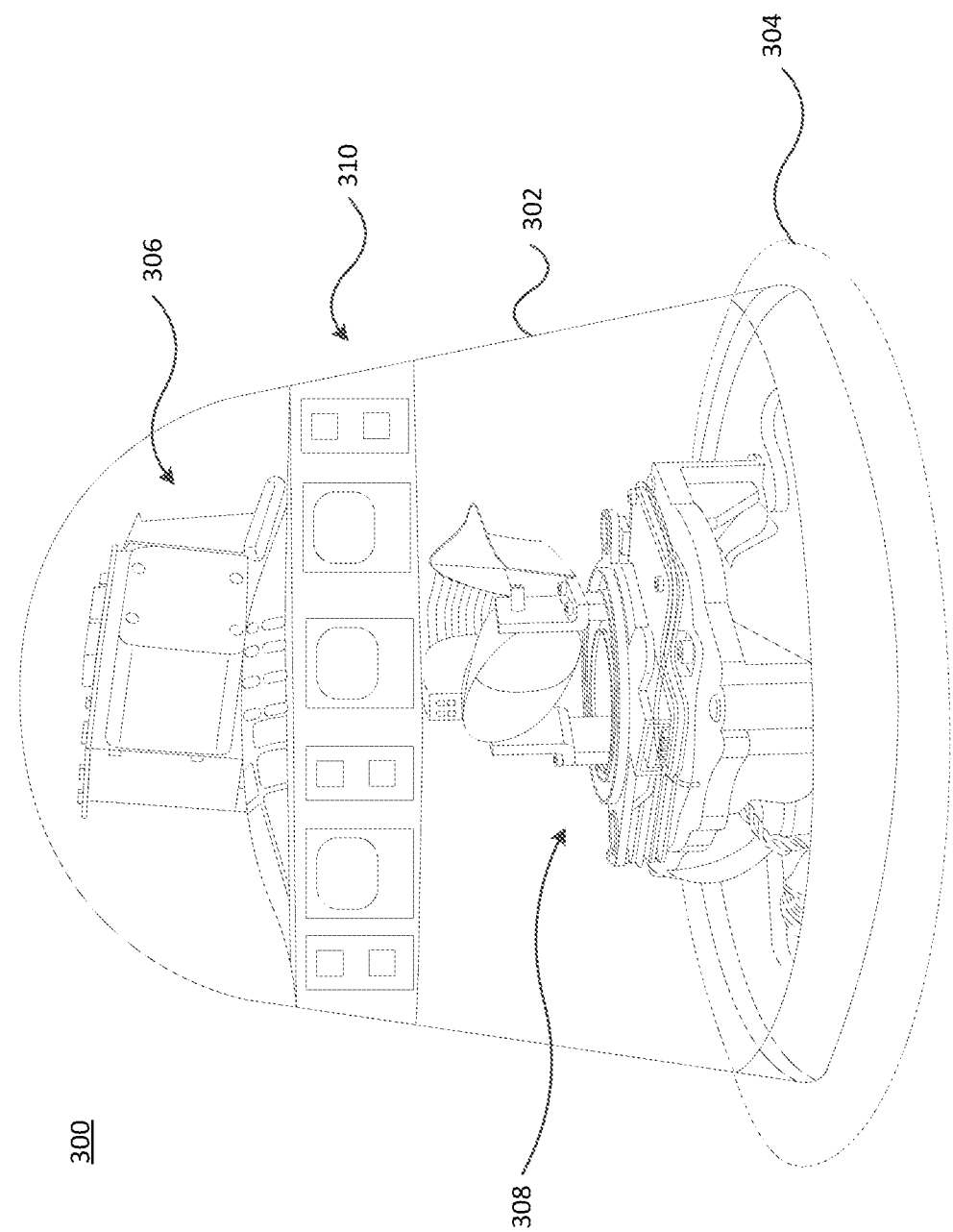
FIG. 3 illustrates an example sensor assembly in accordance with aspects of the disclosure.

FIG. 3 presents an example 300 of a sensor assembly in accordance with aspects of the disclosure. A shown, the sensor assembly includes a housing 302, which is mounted to a portion 304 of a roof of the vehicle as shown by the dashed line. The housing 302 may be dome-shaped as shown, cylindrical, hemispherical, or have a different geometric shape. Within the housing 302 is a first sensor 306 arranged remotely or away from the roof and a second sensor 308 arranged closer to the roof. One or both of the sensors 306 and 308 may be LIDARs or other types of sensors. Disposed between the first sensor 306 and the second sensor 308 is a camera assembly 310, such as a camera ring structure. The camera assembly 310 includes one or more sets of cameras arranged therealong. The housing 302 may be optically transparent at least along the places where the cameras are arranged. While not illustrated in FIG. 3, one or more processors, such as processors 204 of FIG. 2, may be included as part of the sensor assembly. The processors may be configured to process the raw imagery received from the various image sensors of the camera assembly, as well as information received from the other sensors of the overall sensor assembly.

Example Implementations

In addition to the structures and configurations described above and illustrated in the figures, various implementations will now be described.

Figure 4:
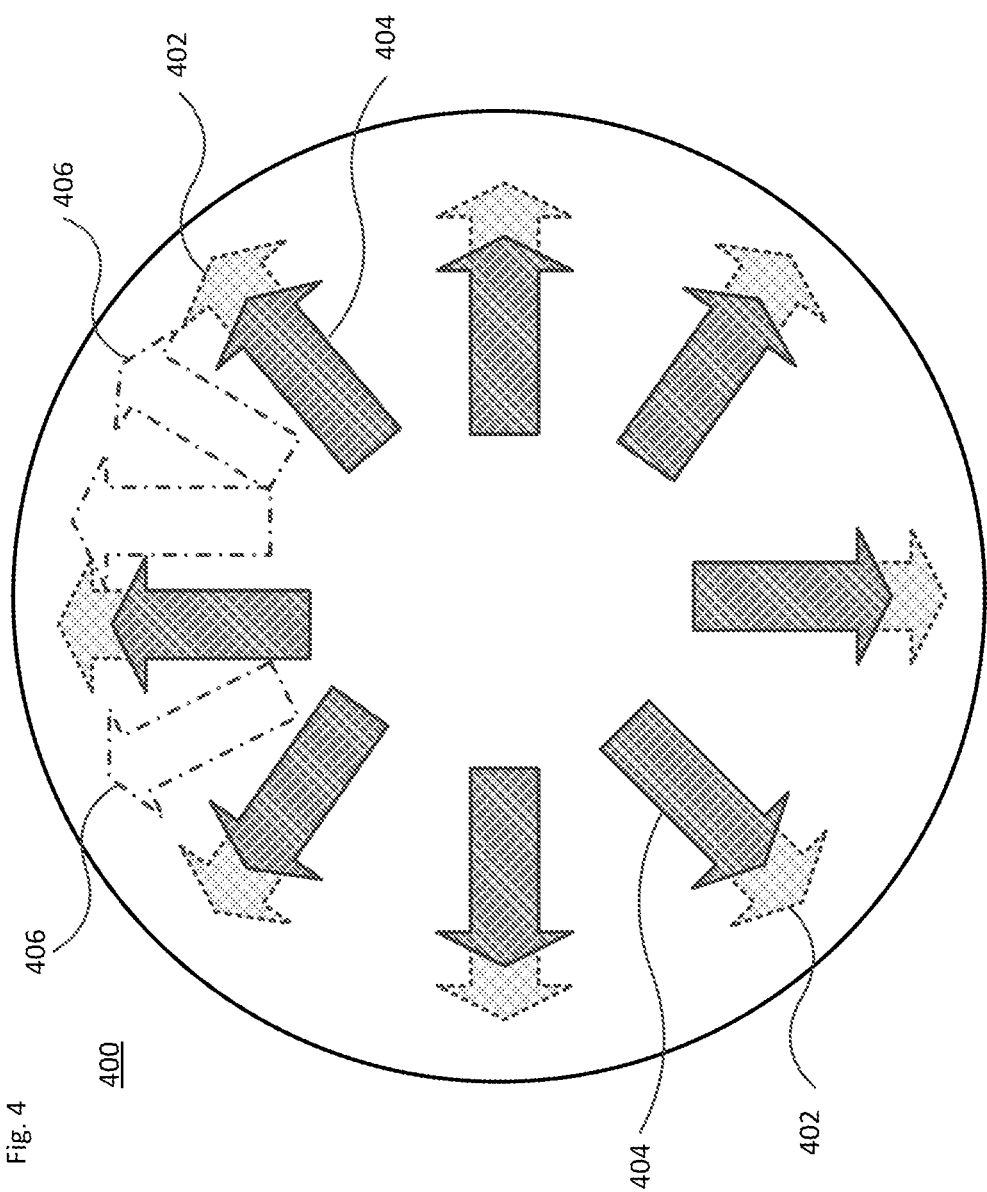
FIG. 4 illustrates an arrangement of image sensors for use in a camera ring structure, in accordance with aspects of the disclosure.

The camera assembly 310 may include a first subsystem having multiple pairs of image sensors positioned to provide an overall 360° field of view around the vehicle. The camera assembly 310 may also include a second subsystem of image sensors generally facing toward the front of the vehicle, for instance to provide an approximately 90° field of view, e.g., to better identify objects on the road ahead. The field of view of this subsystem may also be larger or smaller than 90°, for instance between about 60-135°. FIG. 4 provides an example 400 of the orientations of the various image sensors of the first and second subsystems. The image sensors may be CMOS sensors, although CCD or other types of imaging elements may be employed.

The elevation of the camera subsystems will depend on placement of the camera assembly on the vehicle and the type of vehicle. For instance, if the camera assembly is mounted on or above the roof of a large SUV, the elevation will typically be higher than when the camera assembly is mounted on the roof of a sedan or sports car. Also, the visibility may not be equal around all areas of the vehicle due to placement and structural limitations. By varying the diameter of the camera ring structure and the placement on the vehicle, a suitable 360° field of view can be obtained. For instance, the diameter of the camera ring structure may vary from e.g., between 0.25 to 1.0 meters, or more or less. The diameter may be selected to be larger or smaller depending on the type of vehicle on which the camera assembly is to be placed, and the specific location it will be located on the vehicle.

As shown in FIG. 4, each image sensor pair of the first subsystem includes a first image sensor 402 and a second image sensor 404. The first and second image sensors may be part of separate camera elements, or may be included together in one camera module. In this scenario, the first image sensors 402 are set to auto exposure, while the second image sensors 404 are set to a fixed exposure, e.g., using a dark or neutral density (ND) filter. Here, 8 pairs of image sensors are shown, although more or fewer pairs may be employed. The second image subsystem includes image sensors 406, which may have a higher resolution than those of the first and second image sensors. This enhanced resolution may be particularly beneficial for cameras facing the front of the vehicle, in order to provide the perception system with as much detail of the scene in front of the vehicle as possible. FIG. 4 illustrates 3 image sensors of the second subsystem, although more or fewer image sensors may be used. In the present example, 19 total image sensors are employed in the camera assembly, including the 3 from the second subsystem and 8 pairs from the first subsystem. Again, more or fewer image sensors may be employed in the camera assembly.

The auto-exposed image sensors 402, fixed exposure image sensors 404 and the high resolution image sensors 506 are selected to provide an extended dynamic range, which helps the perception system to identify objects in and features of the environment surrounding the vehicle. In particular, the auto-exposed image sensors 402 are configured to handle low light level situations, such as in the range of 10 to 5,000 cd/m$^2$ (nits), while the fixed exposure image sensors 404 are configured to handle high light level situation, such as in the range of 1,000 to 200,000 nits or higher. And the high resolution image sensors 406 may be able to handle very low light situations, such as in the range of 0.01 to 25 nits. Overall, the dynamic range of the three types of image sensors may be between 10$^{-2}$ nits to 10$^5$ nits. The exact dynamic range for each type of image sensor may vary depending on the specific system requirements and the sensor elements used.

Figure 5A:
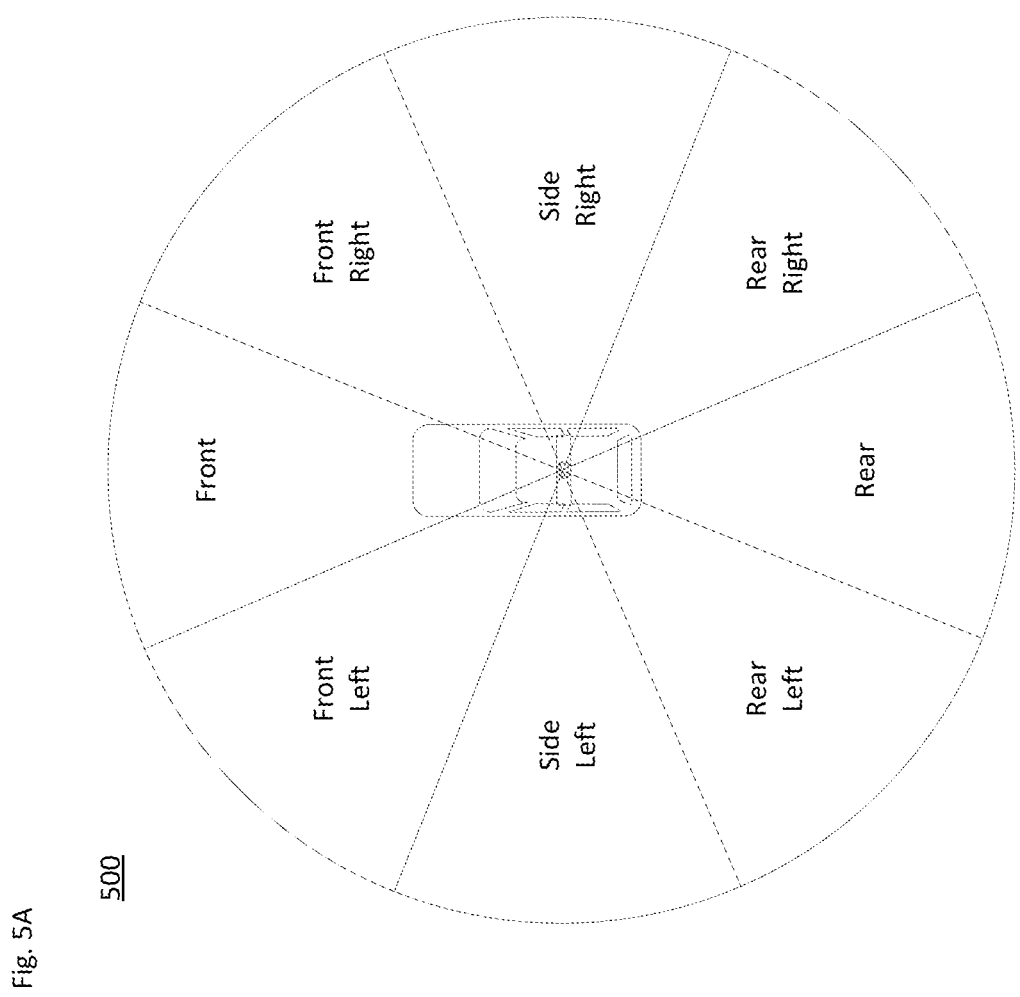
FIGS. 5A-B illustrate fields of view of various types of image sensors in accordance with aspects of the disclosure.
Figure 5B:
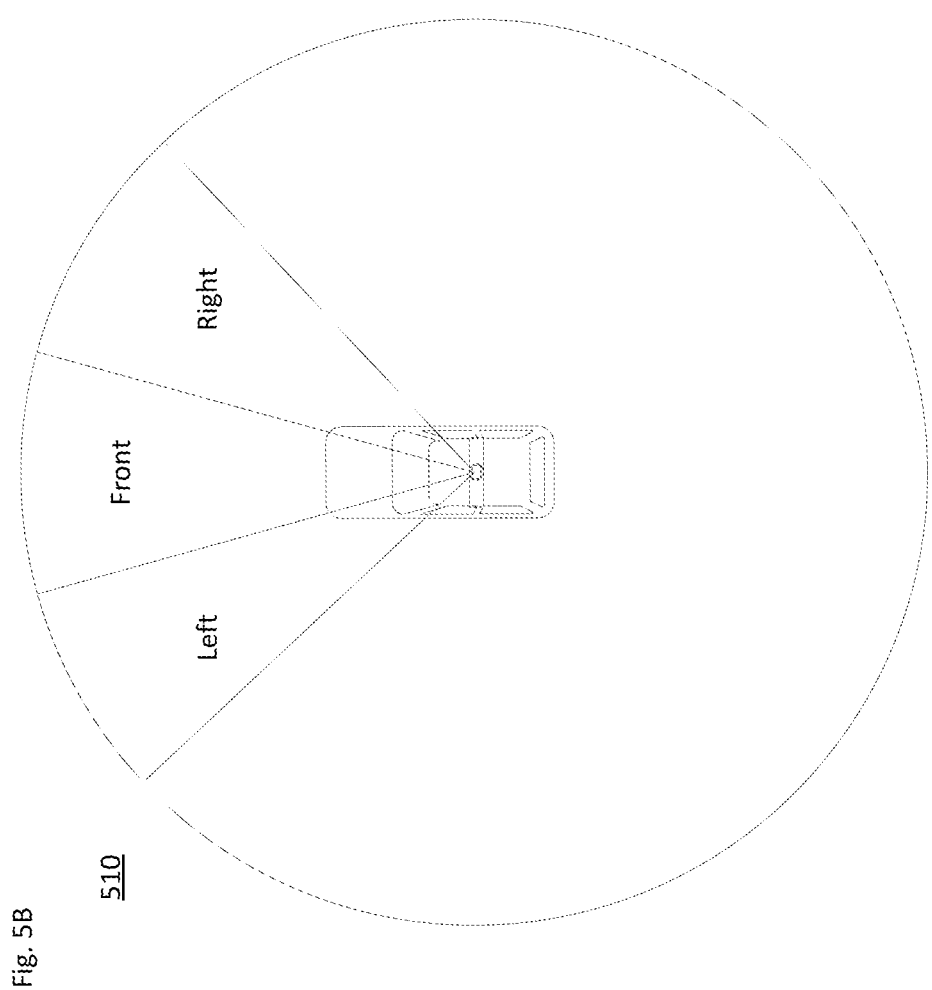

FIGS. 5A and 5B illustrate the fields of view for the image sensors 402, 404 and 406. In particular, FIG. 5A shows an example FOV for the images sensors 402 and 404, and FIG. 5B shows an example FOV for the image sensors 406. Per FIG. 5A, the 8 pairs of image sensors 402 and 404 each cover approximately a 45° FOV. This includes front and rear FOVs with centers at 0° and 180°, respectively, as well as right and left side FOVs with centers at 90° and 270°. The other FOVs are evenly spaced between these as shown in the figure. The pairs of image sensors are co-located, for instance aligned along the same vertical (or Z) axis. In particular, the image sensors 404 may be positioned directly above the image sensors 402. This allows for images obtained by the sensors in each respective pair to be compared for consistency, and can reduce the complexity of the image processing. And per FIG. 5B, the 3 image sensors 406 together cover a 90° FOV, with the central image sensor having a FOV aligned at 0°, and the right and left image sensors having FOVs with centers at 30° and 330°, respectively.

The exact field of view for each image sensor may vary, for instance depending on features of the sensor element. By way of example, the image sensors 402 and 404 may have approximately 50° FOVs, e.g., 49°-51°, while the image sensors 406 may have FOV on the order of 30° or slightly more, e.g., 5-10% more. This allows for overlap in the FOV for adjacent image sensors. The overlap may be measure relative to a point that is a selected distance from the center of the ring of the camera assembly. For instance, the point may be approximately 4 meters from the center of the assembly.

The selected amount of overlap is beneficial, as seams in the imagery generated by the various image sensors are undesirable. In addition, the selected overlap enables the processing system to avoid stitching images together. While image stitching may be done in conventional panoramic image processing, it can be computationally challenging to do in a real-time situation where the vehicle is operating in a self-driving mode. Reducing the amount of time and processing resources required greatly enhances the responsiveness of the perception system as the vehicle drives.

Figure 6B:
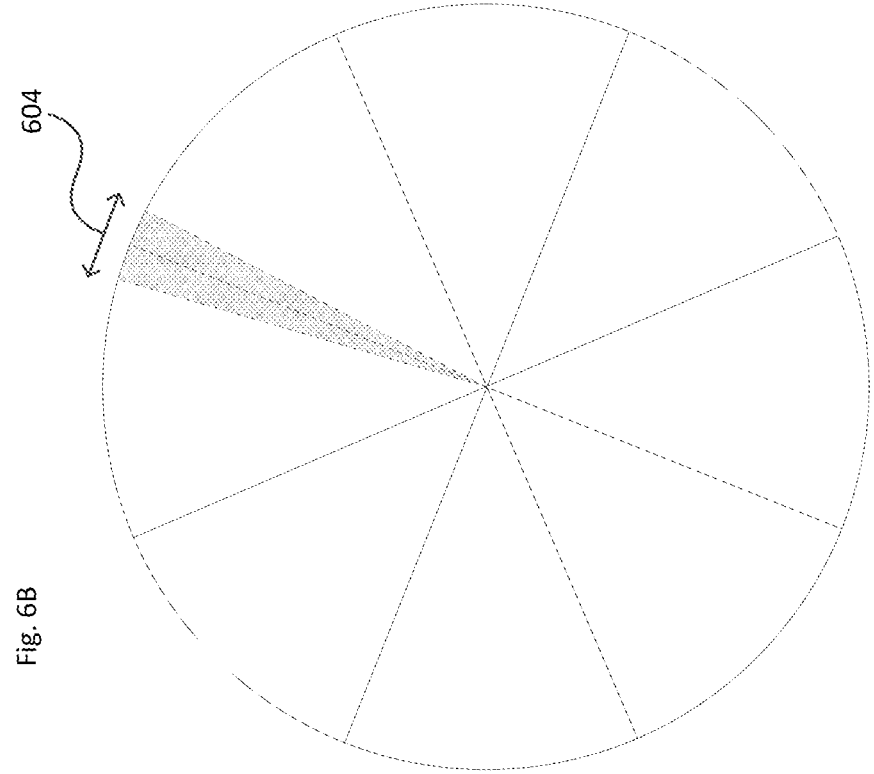
FIGS. 6A-C illustrate overlapping fields of view in accordance with aspects of the disclosure.
Figure 6A:
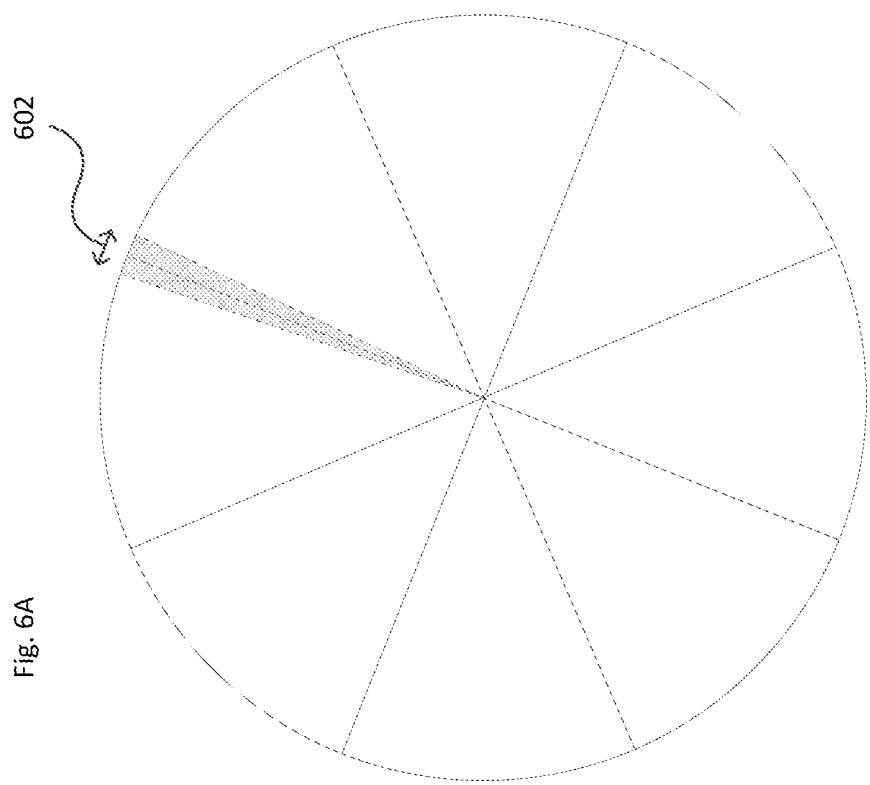
Figure 6C:
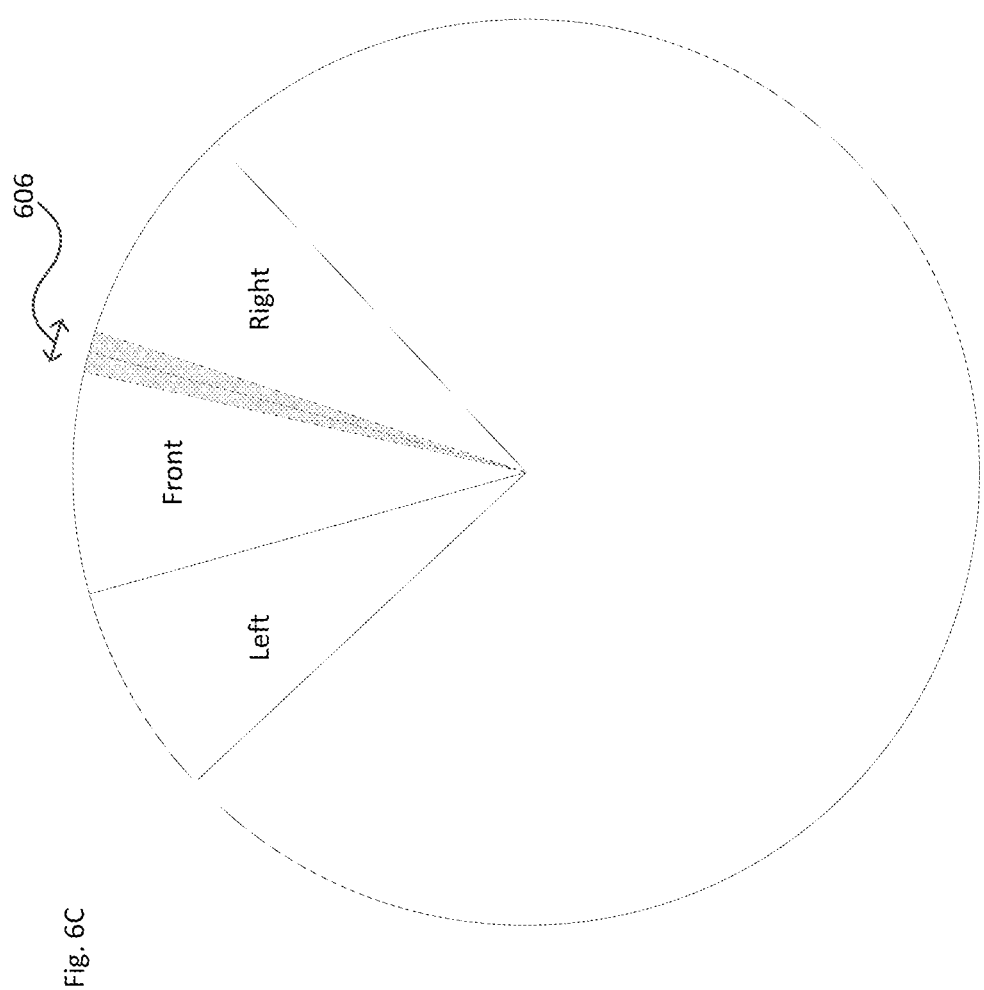

FIGS. 6A-C illustrate examples of image sensor overlap. In particular, for the image sensors 402, there may be an overlap 602 (FIG. 6A) of between 0.5-2°, or alternatively no more than a 1° of overlap. For the image sensors 404, there may be an overlap 604 (FIG. 6B) of between 2-4°, or alternatively no more than a 3.5° overlap. And for the image sensors 406, there may be an overlap 606 (FIG. 6C) of between 3-4°, or alternatively no more than a 5° overlap.

Figure 7A:
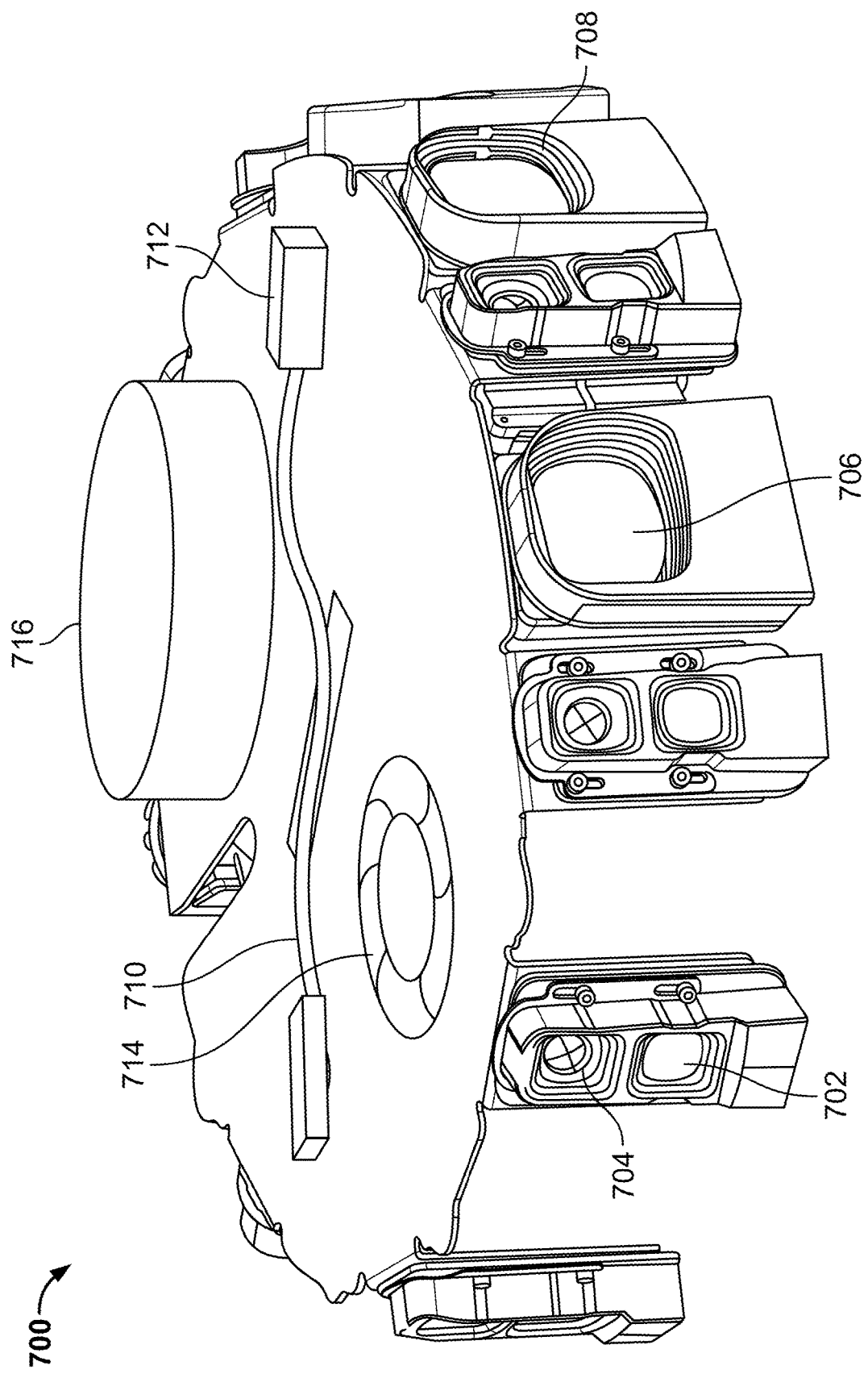
FIGS. 7A-B illustrate views of a camera assembly in accordance with aspects of the disclosure.
Figure 7B:
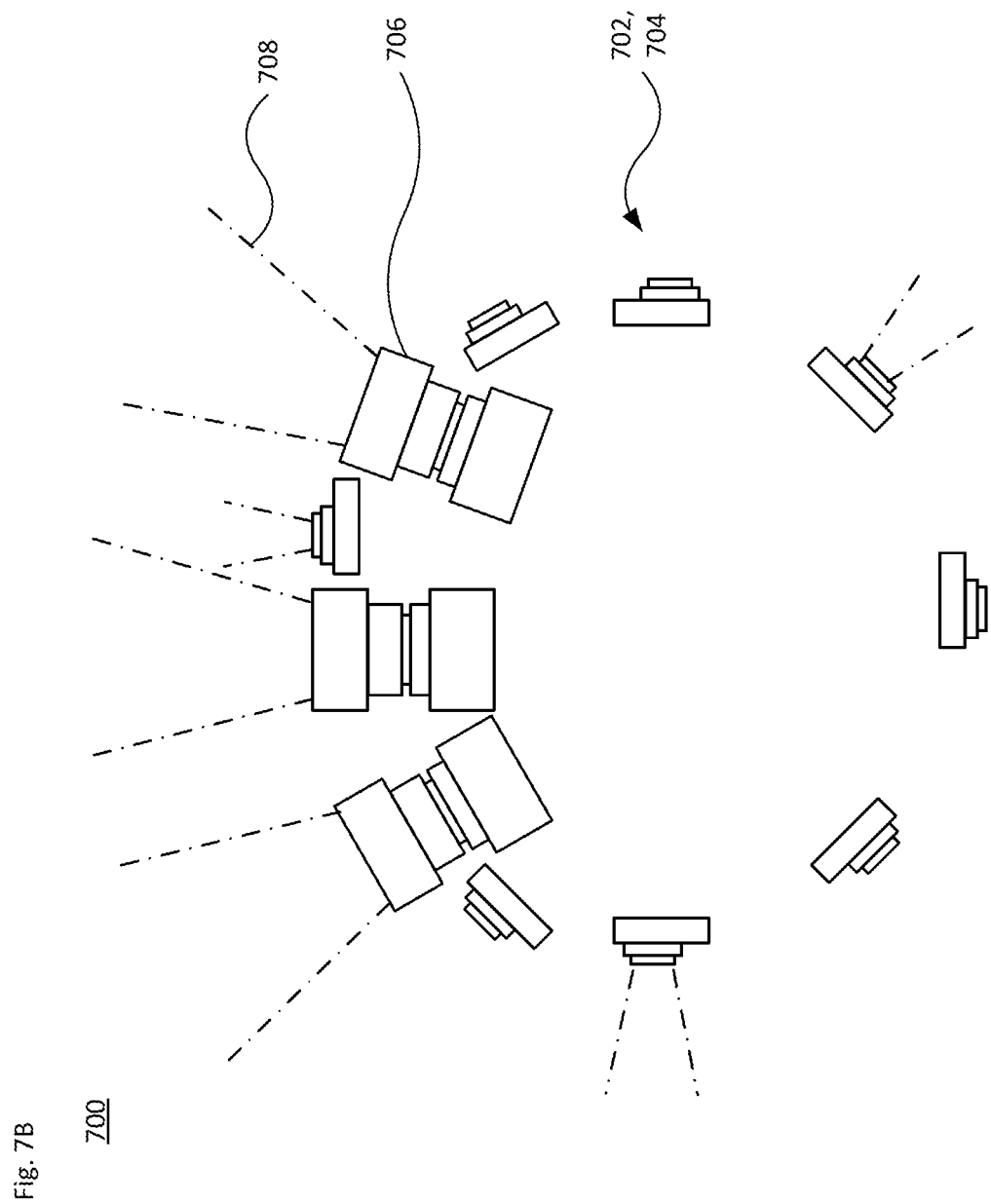

FIG. 7A illustrates a perspective view of a camera assembly arranged as a ring structure 700. FIG. 7B illustrates a top down view with only the camera components shown. Cameras 702, 704 and 706 may correspond to image sensors 402, 404 and 406 of FIG. 4. Dashed projections 708 illustrate example fields of view of the various cameras. Another component of the ring structure is cable 710, which can be a data and/or power cable. For instance, the cable may receive raw image data from the cameras and provides it to image processors via board 712. Fan 714 provides cooling to various components within the sensor housing, and baffle 716 may direct cooled air towards selected components or remove heated air from them. Other portions of the ring structure are discussed in detail below.

Figure 8A:
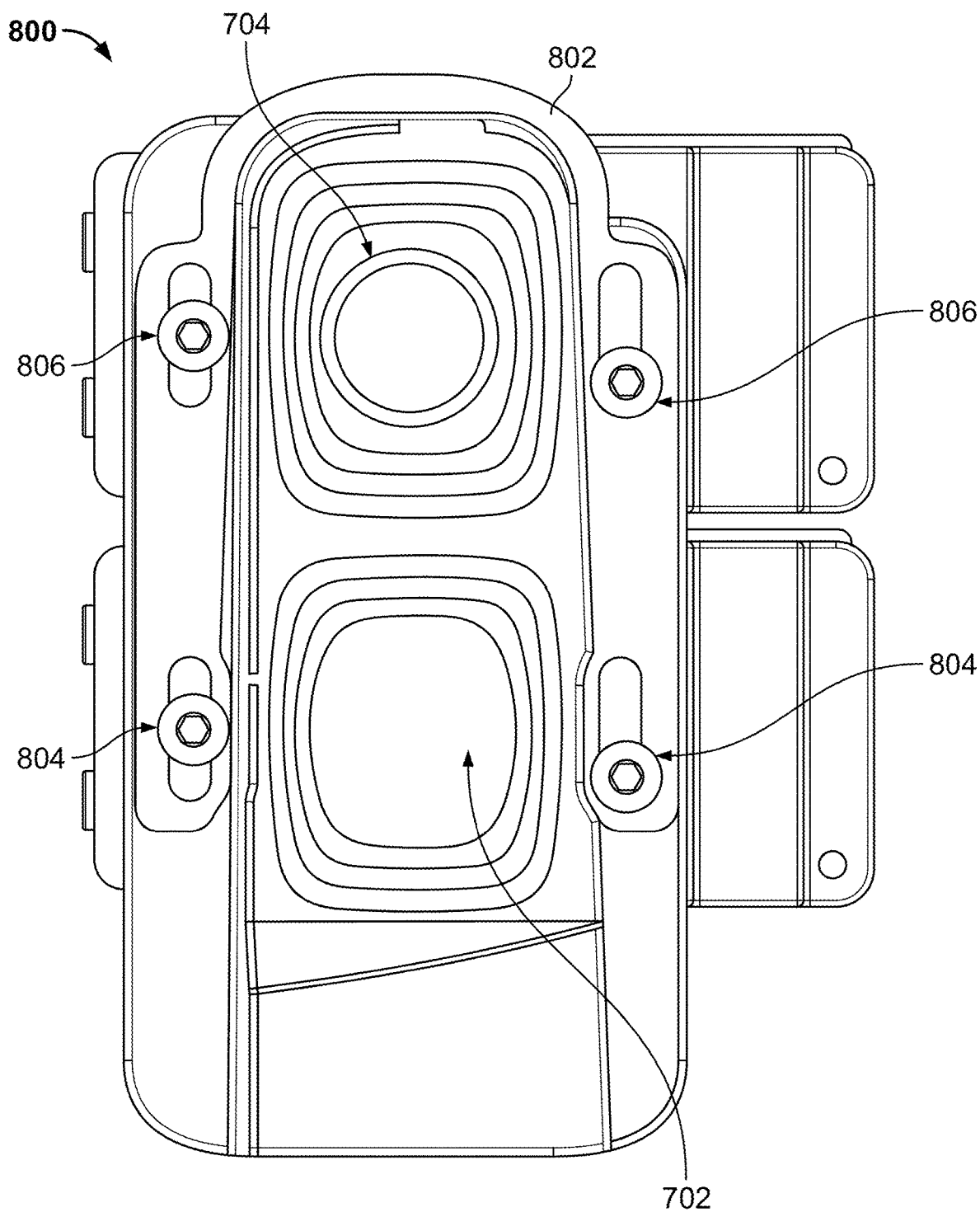
FIGS. 8A-B illustrates camera module in accordance with aspects of the disclosure.
Figure 8B:
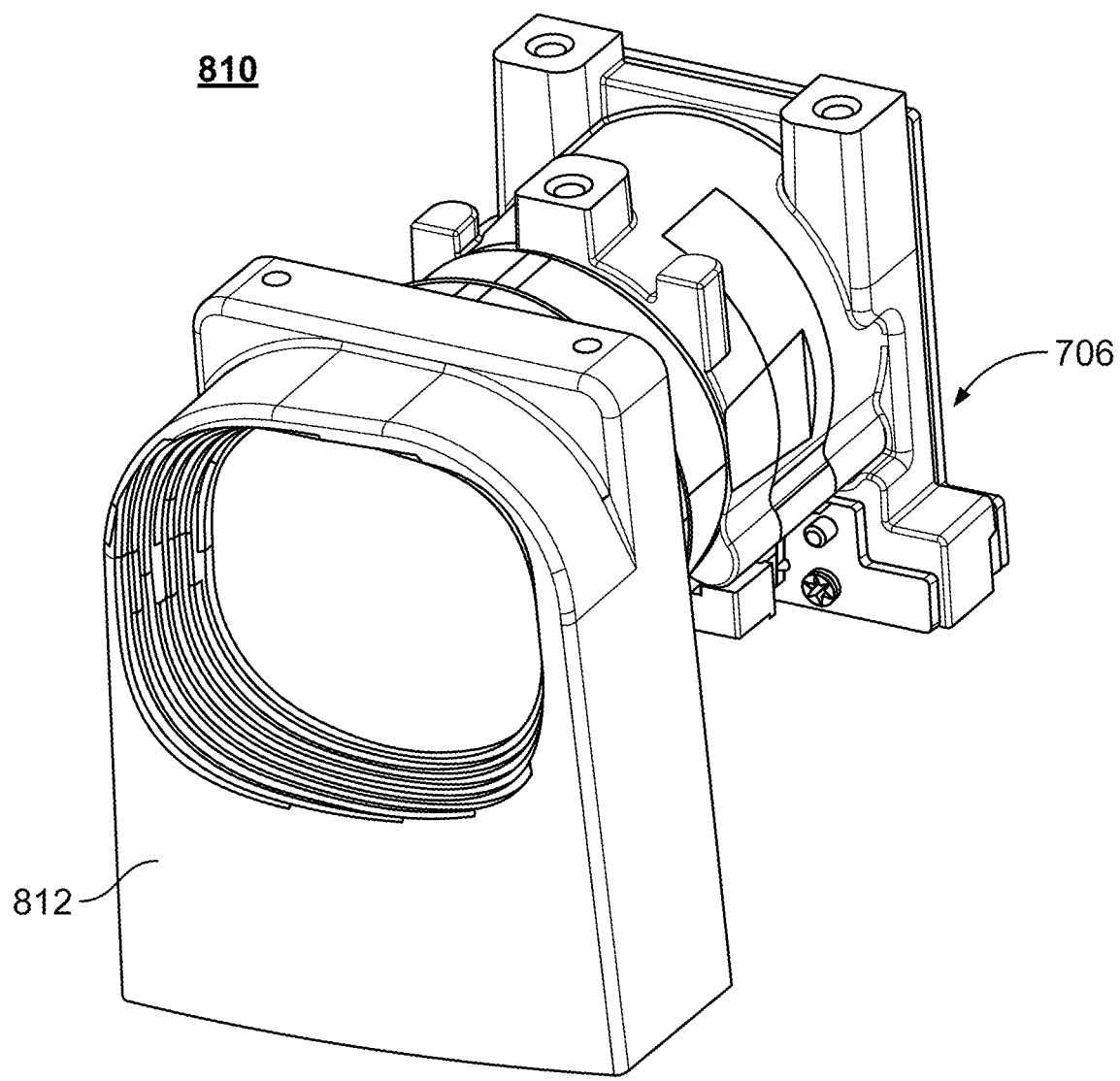

Cameras 702 and 704 are co-located and may be aligned along the same vertical axis. As shown in FIG. 7A, cameras 704, may be set back or recessed relative to the lower cameras, e.g., cameras 702. In one example, the cameras 704 may be recessed between 1-5 cm. Each pair of cameras may be enclosed in a housing of a camera module. FIG. 8A illustrates a camera housing 800 that includes cameras 702 and 704 that correspond to the image sensors 402 and 404, which are received by a camera baffle 802. As shown, pairs of screws or other fasteners 804 and 806 are inserted in mounting holes. These fasteners help to hold the cameras in place in the ring structure. However, one or both of the cameras in the camera module may be subject to pitch and roll. So in addition to overlapping fields of view, the camera assembly also accounts for pitch and roll for imaging elements in the camera modules. And FIG. 8B illustrates camera 706 received by camera baffle 812.

Figure 9B:
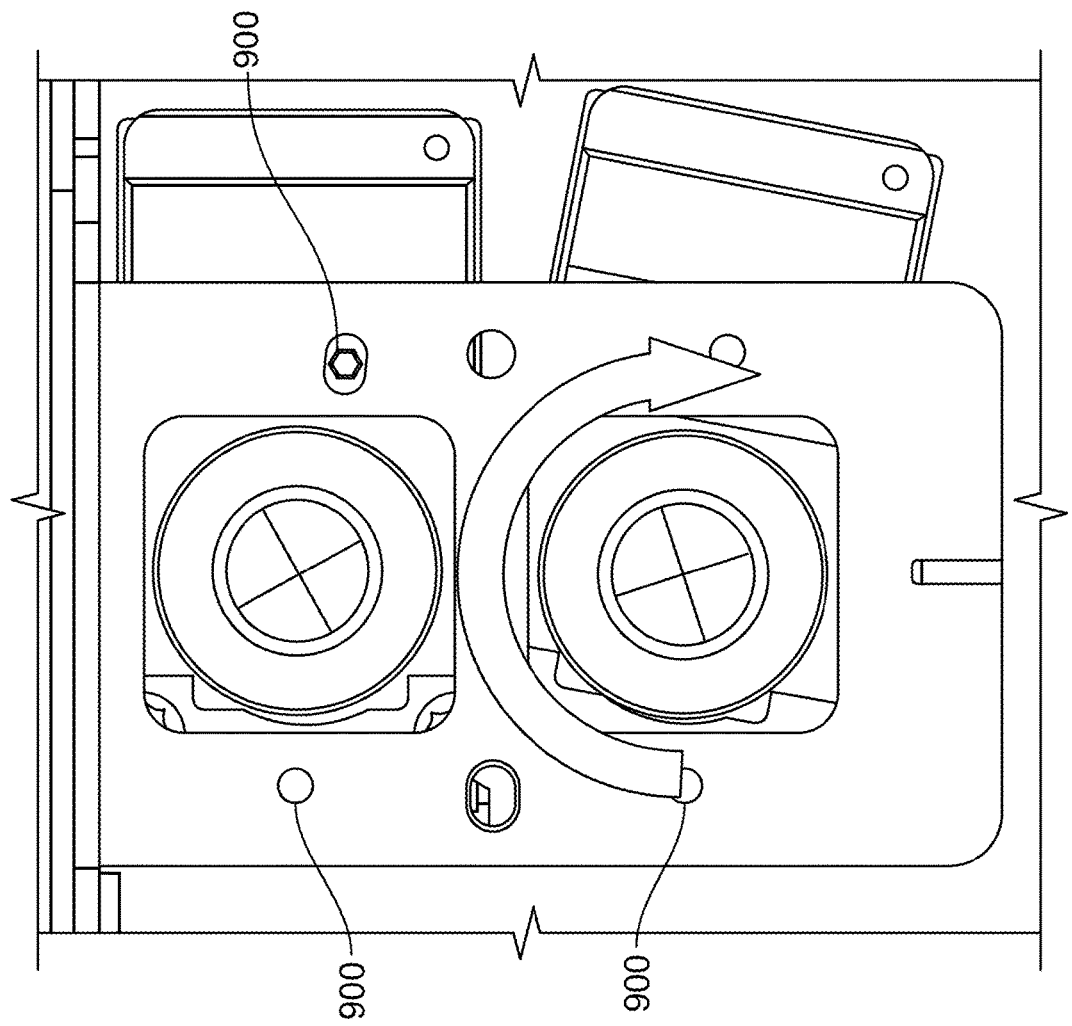
FIGS. 9A-B illustrate pitch and roll of a camera module.
Figure 9A:
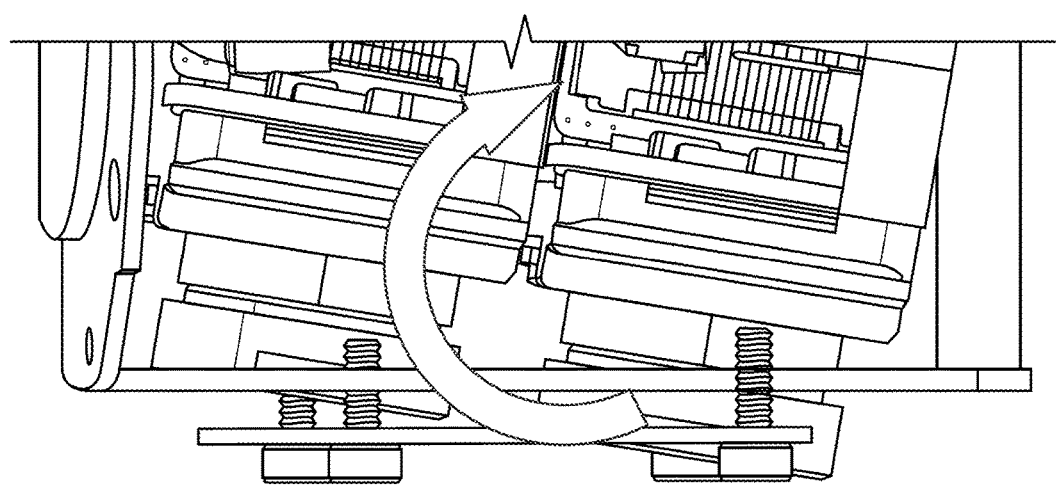

FIGS. 9A-B illustrate examples of pitch and roll, respectively. Regarding pitch-related movement as shown in the side view of FIG. 9A, this may occur due to irregularities in the camera module surfaces, camera pointing irregularities or other factors. For instance, the camera module may be mounted to a support plate of the ring structure. However, there may be an uneven surface on the support plate or bracket connecting the camera module to the support plate. And regarding roll-related movement as shown in the front view of FIG. 9B, such movement may occur due to rotation and "slop" of fasteners relative to the mounting holes 900. It may also be due to internal irregularities of the camera module. The ring structure supporting the various camera modules is configured so that the total variance for pitch, roll and/or yaw is +/−2 degrees from the nominal position.

Returning to FIG. 8, the camera module may include baffles for each camera 702 and 704. The baffles act to block undesirable stray light. They may also help to hold the cameras in the housing. In addition, the baffles can also hold corrective optics for larger cameras.

Figure 10A:
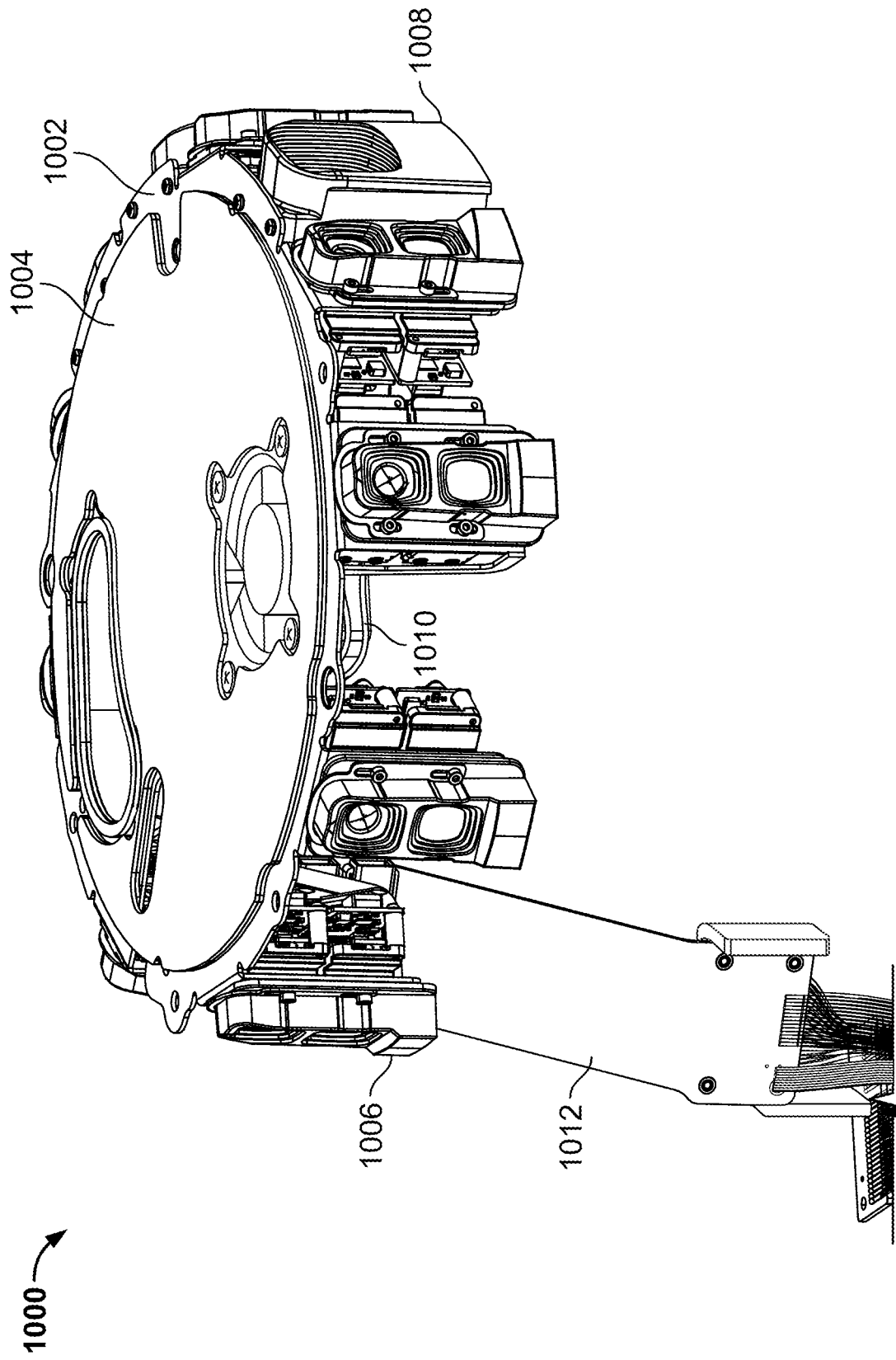
FIGS. 10A-C illustrate portions of a camera assembly in accordance with aspects of the disclosure.
Figure 10B:
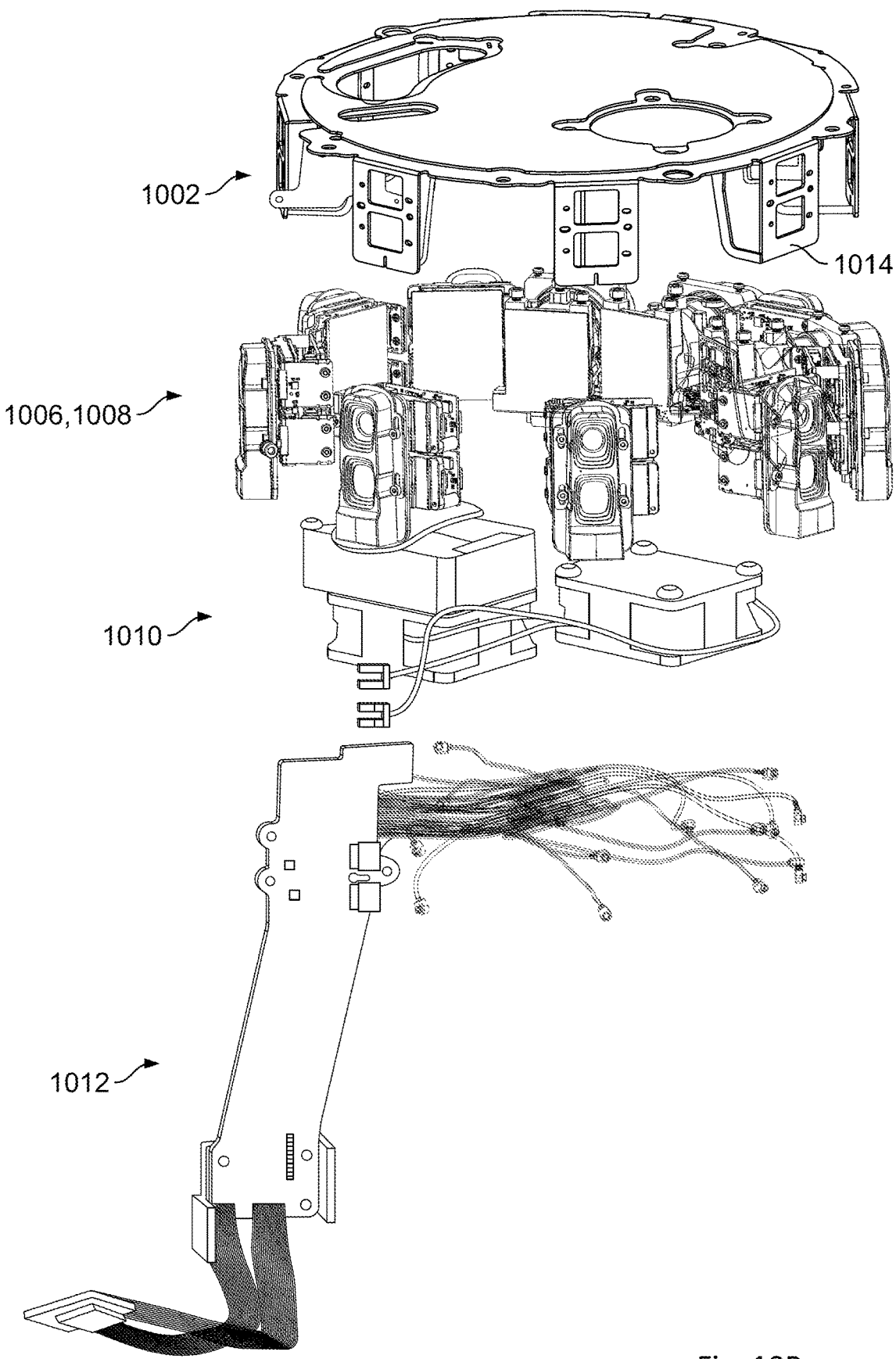
Figure 10C:
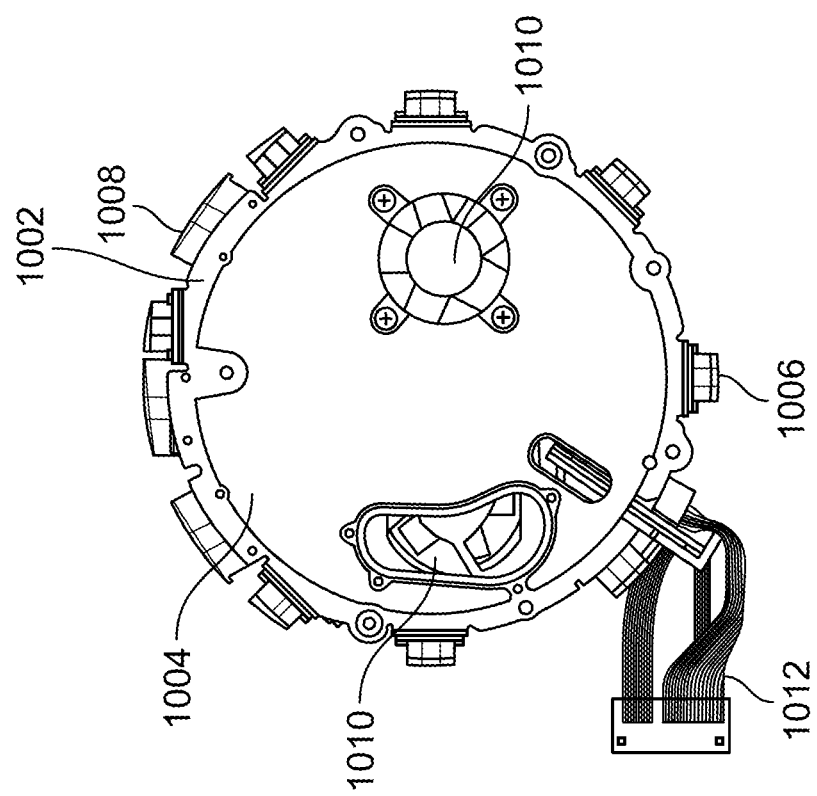

FIG. 10A illustrates a perspective view 1000 of selected components of the camera assembly. FIG. 10B is an exploded view of these components and FIG. 10C is a top view. As shown, the camera assembly includes a chassis 1002 that is generally circular and has a top plate 1004 and camera modules 1006 and 1008 affixed thereto. Fans 1010 are also attached, for example by connection to the top plate 1004. Cabling 1012 may include wiring for data and power lines to the camera modules and the fans. And as best seen in FIG. 10B, the chassis 1002 includes camera mounts 1014 adapted to receive the camera modules 1006 and 1008.

The fans provide ventilation and/or cooling to the components of the camera assembly. The use of dual fans can provide two airflow paths within the housing of the sensor assembly (see FIG. 3), which includes the camera assembly. The airflow paths can also be directed so that air is blown onto optical surfaces, e.g., camera lenses, to keep them clean and free of dust, particles or debris.

Figure 11C:
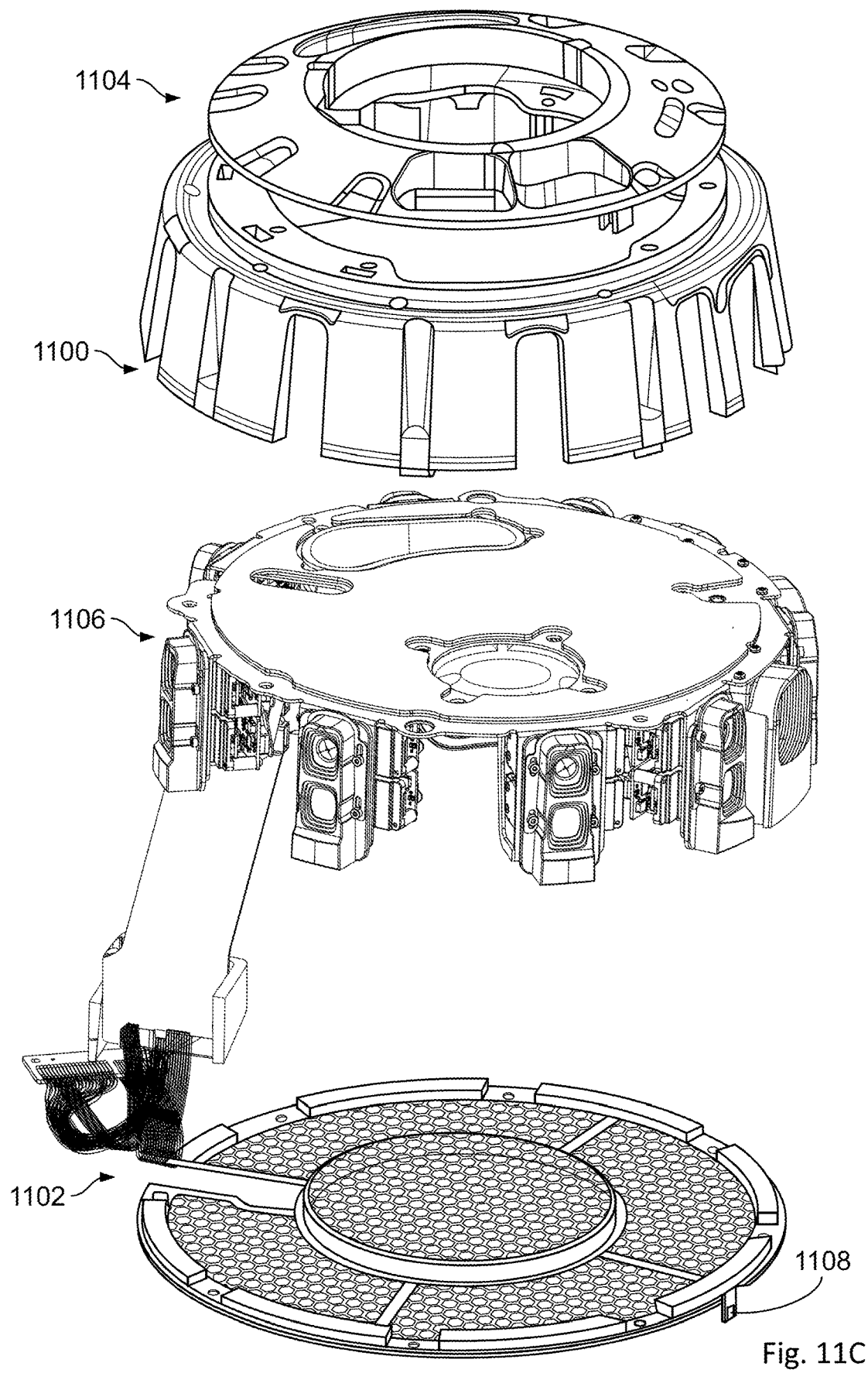

FIGS. 11A-B illustrate side and bottom views of the camera assembly of FIGS. 10A-C with additional components. As shown here, the camera assembly also includes an outer cover 1100 around the ring of cameras, as well as a base plate 1102. The outer cover 1100 is disposed between and connects to the top plate 1004 and the base plate 1102, with openings that provide visibility for the cameras of the camera modules. In one example, the outer cover 1100 is configured to snap into the interior of a dome enclosure. The top plate, outer cover and/or base plate have the ability to act as heat sinks, and work in conjunction with the fans to cool the sensors. A top cover 1104 is affixed to the top plate. Returning to FIG. 3, the sensor 306 may be attached or otherwise coupled to the top cover 1104. The sensor 308 may be disposed beneath the base plate 1102. FIG. 11C illustrates an exploded view of the system, but with camera assembly 1106 including the camera modules, chassis and top plate assembled. Camera assembly 1106 may be bolted or otherwise fastened to the outer cover 1100. Base plate 1102 may then be bolted or otherwise fastened to the outer cover 1100. In the above example, the base plate 1102 is configured to prevent the outer cover 1100 from napping out of the dome enclosure, and provides a clamping load to keep the components rigid. The top cover 1104 is configured to receive the sensor, such as LIDAR, prior to affixation to the outer cover 1100. As shown, one or more flanges 1108 may be provided on the base plate 1102, for instance to act as guides or aids during assembly of the components.

Figure 12A:
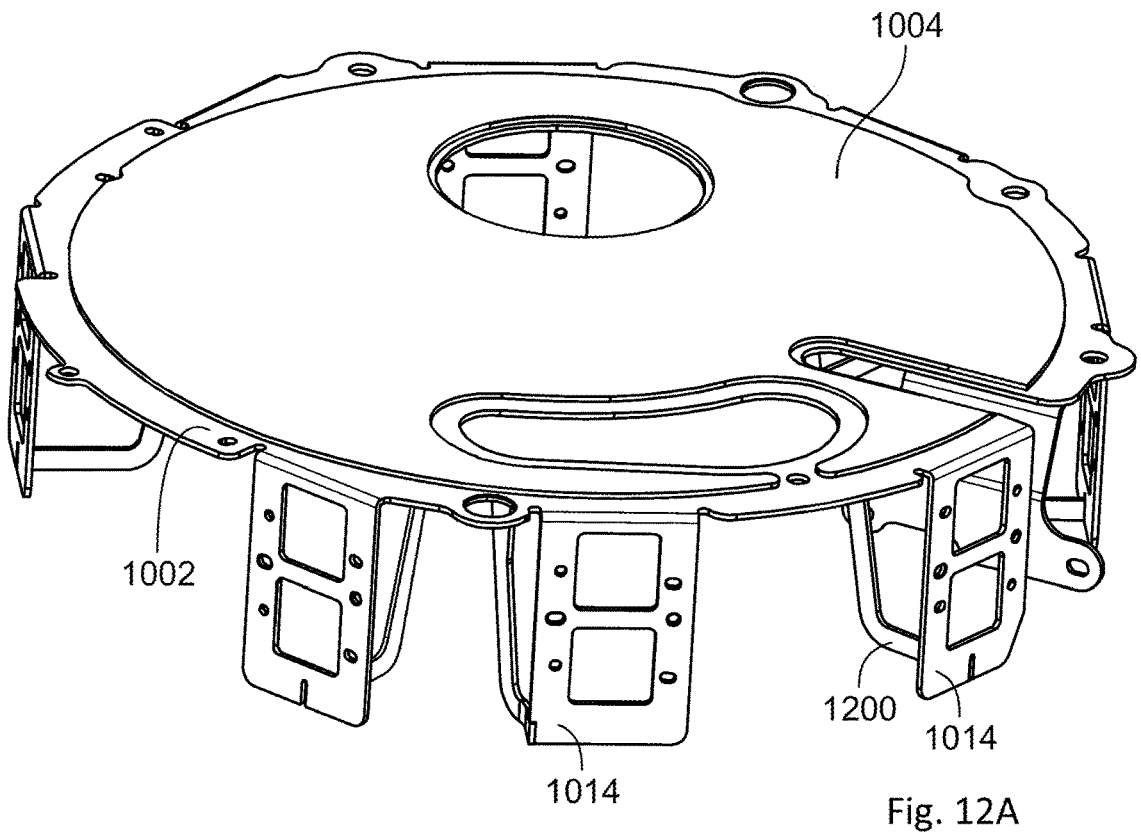
FIGS. 12A-B illustrate a chassis and top plate of a camera assembly in accordance with aspects of the disclosure.
Figure 12B:
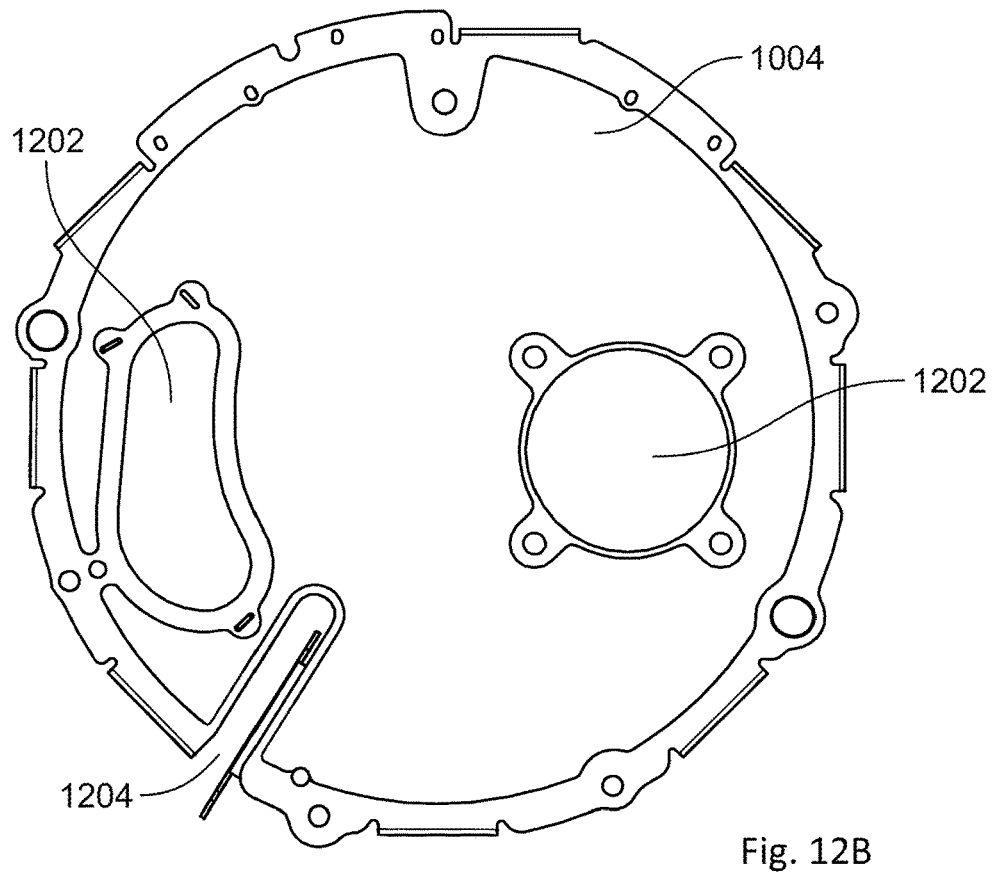

FIGS. 12A-B illustrate the chassis 1002 and top plate 1004 without the camera modules or other components. As shown, the chassis includes support braces 1200 to reinforce the camera mounts 1014. The top plate 1004 includes openings 1202 to allow airflow from the fans. A slot element 1204 is also provided. The slot element may be used to allow for cabling to run from one of the other sensors, e.g., sensor 308 of FIG. 3, to proceeding and/or power modules of the system.

Figure 13A:
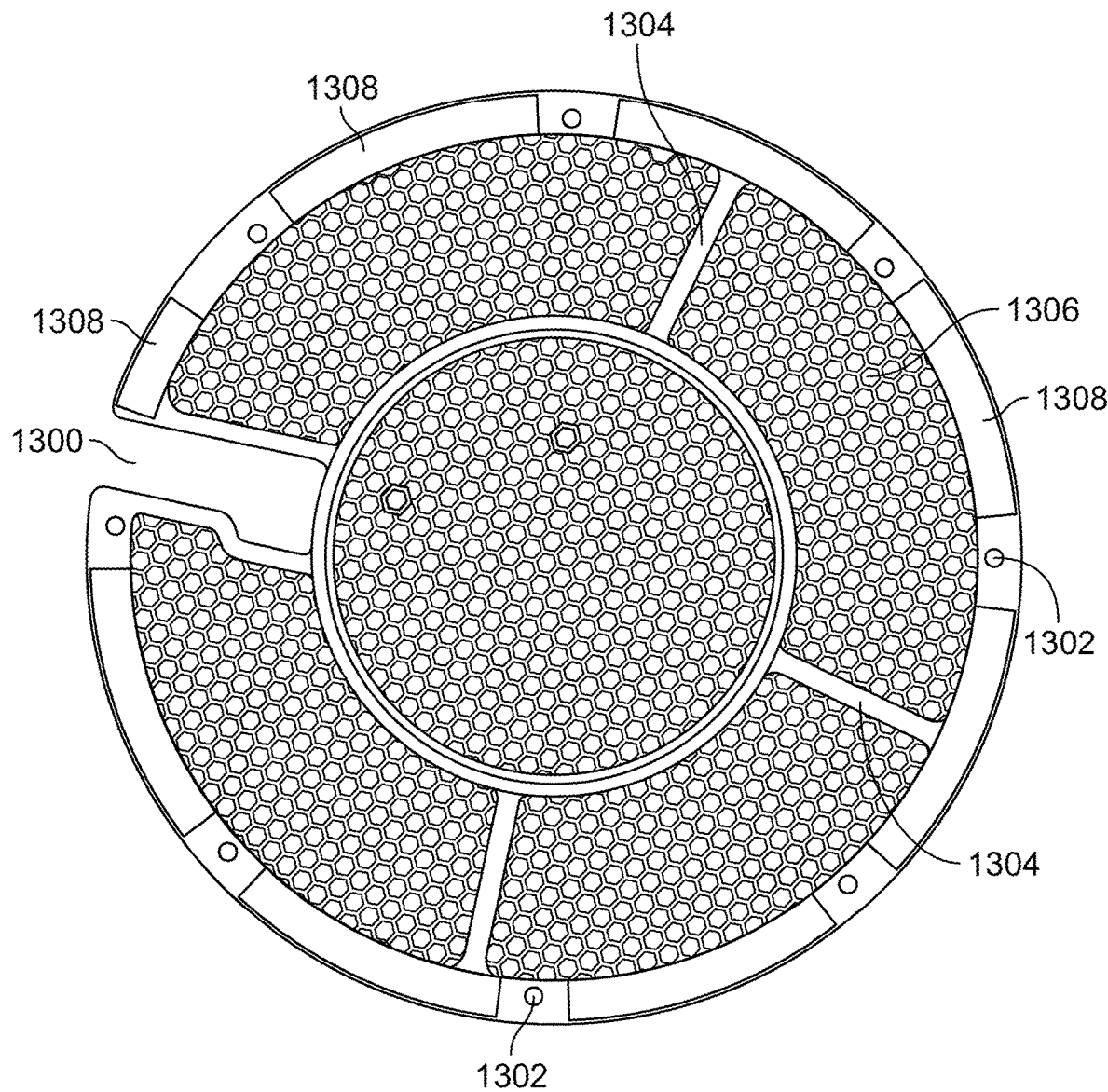
FIGS. 13A-C illustrate a base plate in accordance with aspects of the disclosure.
Figure 13B:
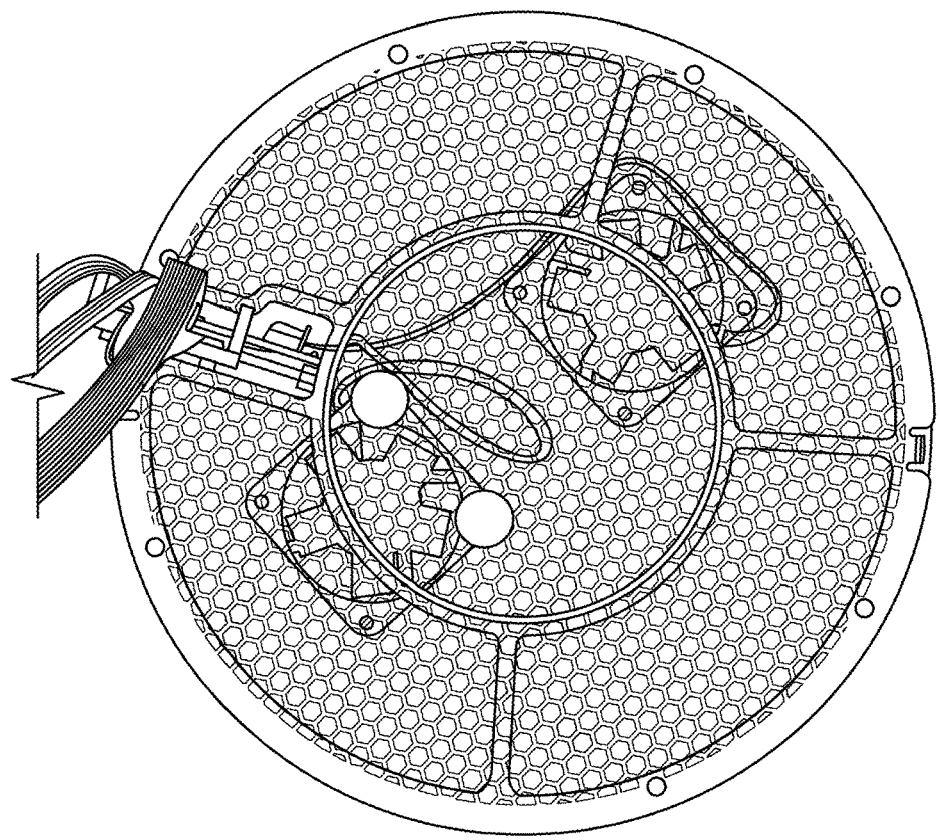
Figure 13C:
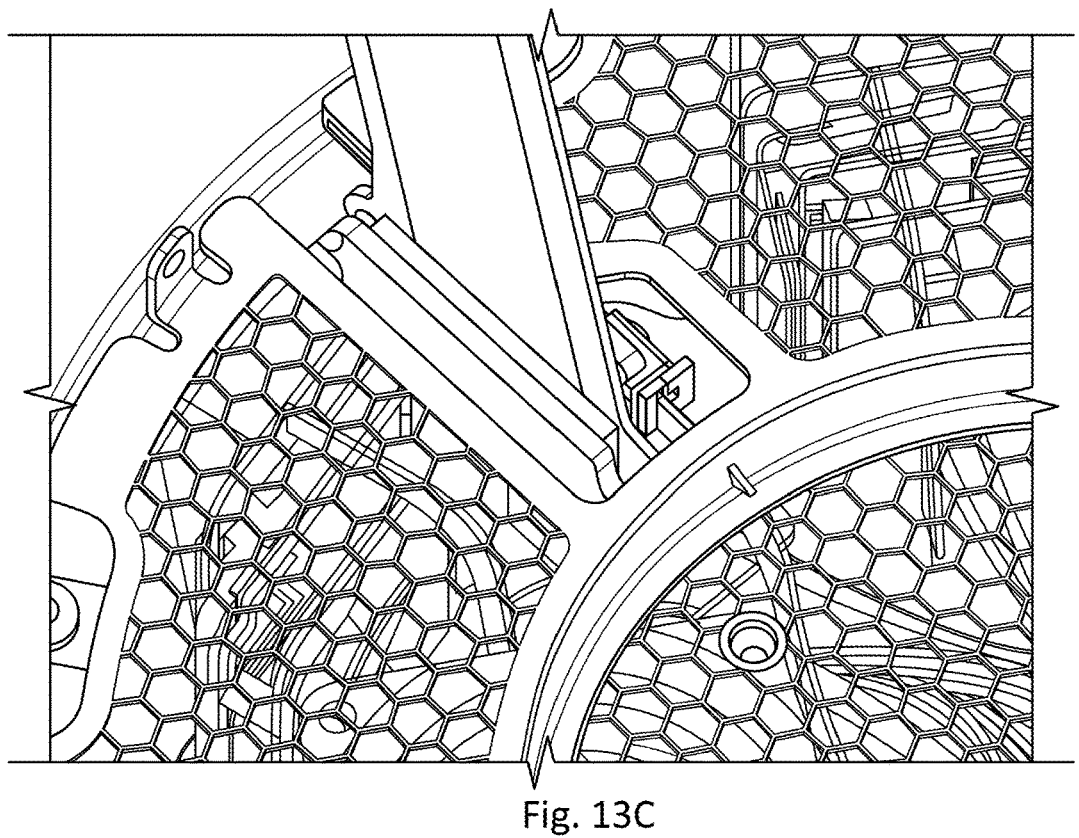

FIGS. 13A-C illustrate the base plate 1102 of FIG. 11. FIG. 13A illustrates the base plate without other components. Similar to the top plate, the base plate includes a slot 1300 to provide a passage for the cabling 1012 (FIG. 10A). The base plate also includes a series of mounting points 1302 around the circumference of the rim. These mounting points may be used to affix the base plate to camera modules of the camera assembly, to other sensors, or to a support structure of the sensor assembly. One or more struts 1304 are also provided for structural rigidity.

As shown, a covering 1306 extends across the base plate. The covering 1306, which may be solid or a mesh-type arrangement, is configured to provide EMI protection, for instance by reducing interference from other sensors such as LIDAR or radar, or from other components such as a GPS receiver of the vehicle. The top plate 1004 (FIG. 10A) and the outer cover 1100 may also provide EMI protection to the camera modules and other components of the sensor assembly. In addition, these components are also able to protect other sensors from emissions by the camera modules. Such EMI components may be made of metal or of electroplated plastic structures and collectively may act as a Faraday cage. In addition, EMI insulating foam pads 1308 may be arranged around the rim of the base plate to provide further EMI protection. Similar pads may be provided with the top plate 1004 and/or top cover 1104. FIG. 13B illustrates the base plate as well as the relative positions of the fans of the sensor assembly. And FIG. 13C provides an enlarged view showing how the cabling passes through the slot.

This arrangement as shown in FIGS. 10-13 provides for relative stiffness of the camera assembly. Preferably, it provides a stiffness that permits less than 1-1.5 pixels of movement for the image sensors in the camera modules. That helps minimize imaging artifacts, gaps and other defects in the imagery obtained by the cameras.

Figure 14A:
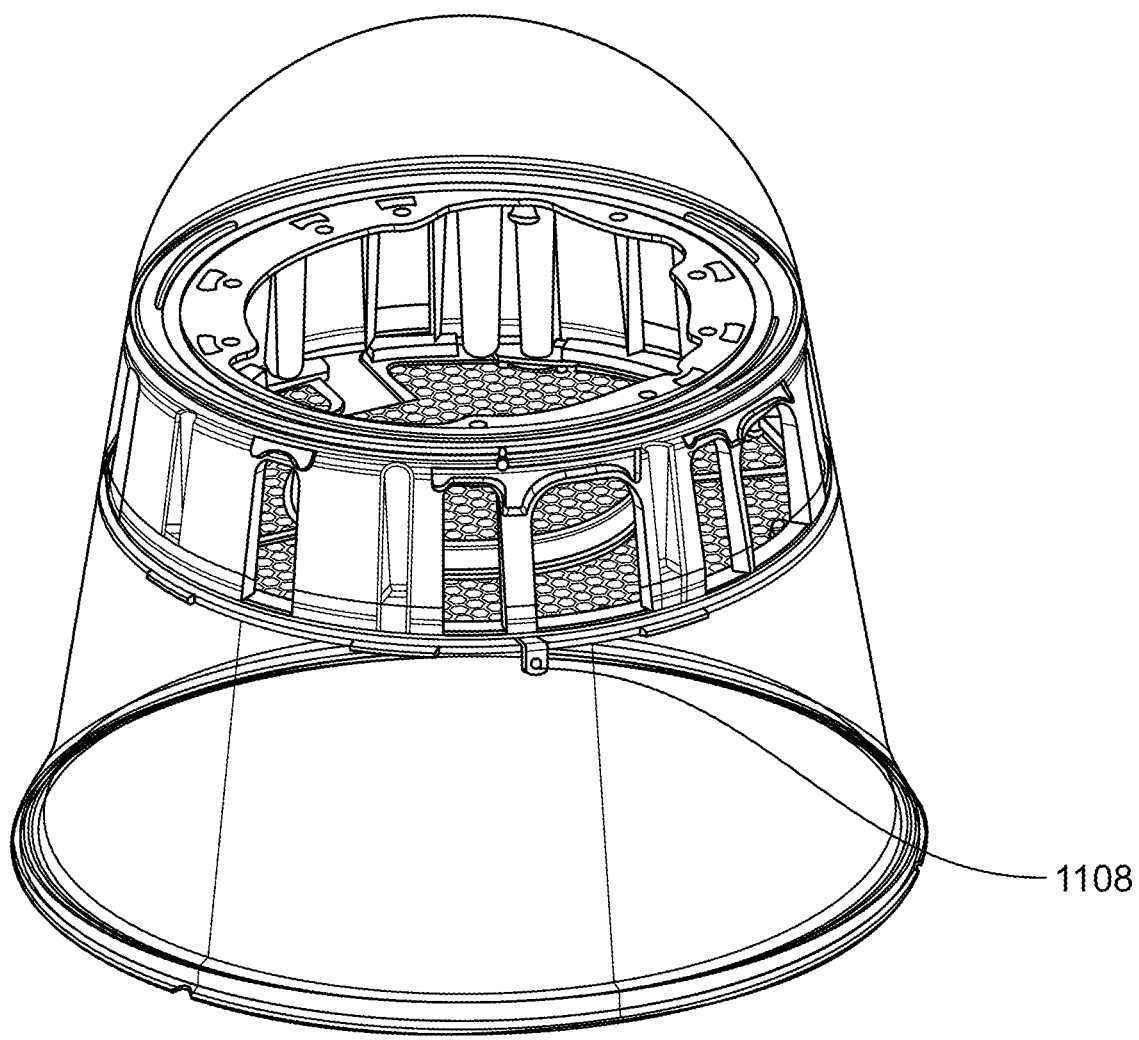
FIGS. 14A-C illustrate a sensor housing with elements of the camera assembly in accordance with aspects of the disclosure.
Figure 14C:
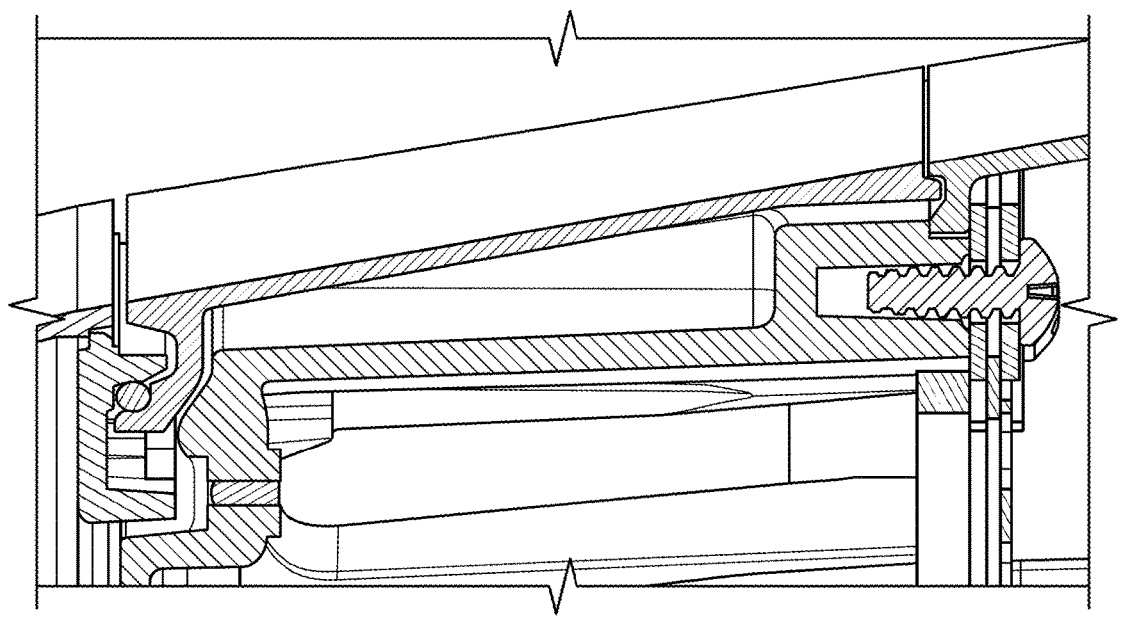
Figure 14B:
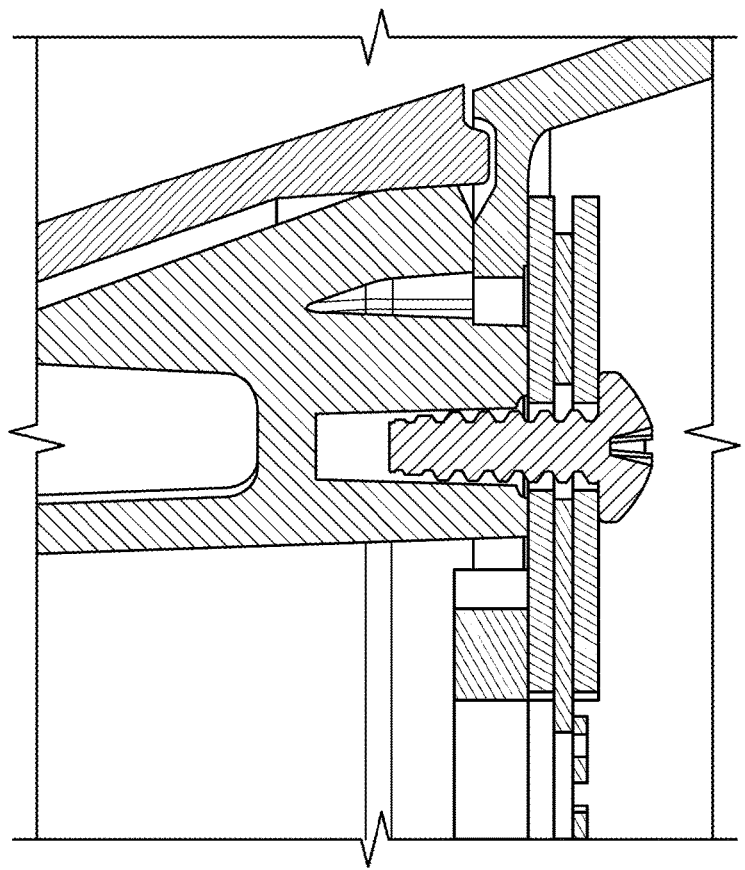

FIG. 14A illustrates portions of the camera assembly within a housing, such as housing 302 of FIG. 3. As noted above, the housing may be dome-shaped as shown, cylindrical, hemispherical, or have a different geometric shape. The particular shape may depend on the specific configuration of the camera assembly and other sensors within the housing. For clarity, the camera modules, top plate and cover are omitted. The housing may be a single piece unitary component or may be formed of multiple components. In either arrangement, the camera assembly is mounted within the housing and is preferably secured directly to the housing. For instance, as shown in the cross sectional views of FIGS. 14B and 14C, the camera assembly may be fastened to various mounting points along the housing. Gussets, foam tape and other elements may be used to dampen vibrations on the camera housing.

The camera assembly discussed herein provides multiple sets of cameras arranged to give 360° visibility to the vehicle's perception system. The camera assembly, which can include multiple camera modules arranged in a ring around a central axis, can be located in a housing with other sensors such as LIDAR and radar sensors. Because the camera assembly is configured as a single unit, it may be easily inserted and removed from a sensor housing. This allows for the repair or replacement of individual camera modules quickly and efficiently. By co-locating pairs of image sensors in one camera module, those image sensors can have the same effective field of view. Co-location also helps with image processing and cleaning of the cameras, which are also important for vehicles driving in an autonomous mode.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The inveention claimed is:

1. A sensor assembly, comprising:
   a housing having a base region configured to attach to a surface of a vehicle;
   a first sensor on a first portion of the housing, the first sensor being configured to provide a first set of sensor data associated with objects in an external environment of the vehicle;
   a camera assembly comprising:
      a camera module affixed to a second portion of the housing that is closer to the base region than the first portion of the housing, and
      an image sensor disposed in the camera module, the image sensor configured to provide a second set of sensor data associated with objects in the external environment of the vehicle; and
   a second sensor disposed on a third portion of the housing that is closer to the base region than the first and second portions of the housing, the second sensor being configured to provide a third set of sensor data associated with objects in the external environment along a selected direction of the vehicle, the second sensor having an overlapping field of view with the image sensor.

2. The sensor assembly of claim 1, wherein the second sensor includes another image sensor having a higher resolution than a resolution of the image sensor of the camera assembly.

3. The sensor assembly of claim 1, wherein the first sensor is a lidar sensor.

4. The sensor assembly of claim 1, wherein the first sensor is another image sensor.

5. The sensor assembly of claim 1, wherein the first sensor has at least a partially overlapping field of view with the image sensor.

6. The sensor assembly of claim 1, further comprising a plate member separating the second portion from the first portion.

7. The sensor assembly of claim 6, wherein the plate member is configured to provide electromagnetic interference protection between the first sensor and the camera module.

8. The sensor assembly of claim 1, wherein the image sensor is set to a fixed exposure.

9. The sensor assembly of claim 1, wherein the image sensor is set to auto exposure.

10. The sensor assembly of claim 1, wherein the image sensor comprises a set of at least two image sensors.

11. The sensor assembly of claim 1, wherein:
the camera module comprises a plurality of camera modules distributed along a perimeter of the second portion of the housing; and
each camera module includes a corresponding image sensor disposed therein.

12. The sensor assembly of claim 11, wherein the corresponding image sensor in at least one of the camera modules comprises a set of at least two image sensors.

13. The sensor assembly of claim 1, wherein the second sensor comprises a set of at least three image sensors including a central image sensor, a side image sensor adjacent to a first side of the central image sensor, and a side image sensor adjacent to a second side of the central image sensor.

14. The sensor assembly of claim 13, wherein:
the first side image sensor is disposed at a first angle relative to the central image sensor; and
the second side image sensor is disposed at a second angle relative to the central image sensor.

15. A vehicle, comprising:
a driving system configured to perform driving operations in an autonomous mode;
a perception system configured to detect objects in an environment surrounding the vehicle during the driving operations in the autonomous mode; and
a control system operatively coupled to the driving system and the perception system, the control system having one or more computer processors configured to receive data from the perception system and to direct the driving system when operating in the autonomous mode;
wherein the perception system includes a sensor assembly, the sensor assembly including:
a housing having a base region attached to a surface of the vehicle;
a first sensor on a first portion of the housing, the first sensor being configured to provide a first set of sensor data associated with objects in an external environment of the vehicle;
a camera assembly comprising:
a camera module affixed to a second portion of the housing that is closer to the base region than the first portion of the housing, and
an image sensor disposed in the camera module, the image sensor configured to provide a second set of sensor data associated with objects in the external environment of the vehicle; and
a second sensor disposed on a third portion of the housing that is closer to the base region than the first and second portions of the housing, the second sensor being configured to provide a third set of sensor data associated with objects in the external environment along a selected direction of the vehicle, the second sensor having an overlapping field of view with the image sensor.

16. The vehicle of claim 15, wherein the base region of the housing is attached to a roof of the vehicle.

17. The vehicle of claim 16, wherein the third portion of the housing is arranged along the base region.

18. The vehicle of claim 17, wherein the first sensor is a lidar sensor and the second sensor includes another image sensor having a higher resolution than a resolution of the image sensor of the camera assembly.

19. The vehicle of claim 15, wherein:
the camera module comprises a plurality of camera modules distributed along a perimeter of the second portion of the housing; and
each camera module includes a corresponding image sensor disposed therein.

20. The vehicle of claim 15, further comprising a plate member separating the second portion from the first portion, wherein the plate member is configured to provide electromagnetic interference protection between the first sensor and the camera module.

* * * * *